(12) United States Patent
Kelsoe

(10) Patent No.: US 6,902,767 B2
(45) Date of Patent: Jun. 7, 2005

(54) PROCESS FOR TREATING WOOD AND PRODUCTS FROM TREATED WOOD

(75) Inventor: Darrell W. Kelsoe, Semmes, AL (US)

(73) Assignee: D & L, LLC, Destin, FL (US)

( * ) Notice: Subject to any disclaimer, the term of this patent is extended or adjusted under 35 U.S.C. 154(b) by 0 days.

(21) Appl. No.: 10/274,057

(22) Filed: Oct. 17, 2002

(65) Prior Publication Data

US 2003/0087035 A1 May 8, 2003

Related U.S. Application Data

(63) Continuation-in-part of application No. 09/885,642, filed on Jun. 20, 2001, and a continuation-in-part of application No. 09/788,165, filed on Feb. 15, 2001, now abandoned.
(60) Provisional application No. 60/213,198, filed on Jun. 21, 2000.

(51) Int. Cl.$^7$ ................................................. B05D 7/06
(52) U.S. Cl. ........................................ 427/387; 427/393
(58) Field of Search ................................... 427/387, 393

(56) References Cited

U.S. PATENT DOCUMENTS 5,871,817 A * 2/1999 Nasheri ..................... 427/317

FOREIGN PATENT DOCUMENTS

PL            148704        * 11/1989

OTHER PUBLICATIONS

Liu et al, Chinese Journal of Polymer Science, 18(2), pp 161–168, 2000.*
Saka et al, Wood Sci Technol., 31(6), pp 457–466, 1997.*
Schuldt et al, Papier, 48(1), pp 3–5,8–10,12–13,16–17, 1994.*

* cited by examiner

Primary Examiner—Erma Cameron

(57) ABSTRACT

Wood cellulose is treated with a reactive silicate. The reaction is done to cellulose within the wood and may be catalyzed with acid or base catalysts or a carbon silicon halogen combination which produces in situ acid catalysts or a different combination to produce an in situ base catalyst which replaces some of the molecules or atoms within the cellulose structure with silicon, boron or other hydrophobic or anti-degrading agents. Preferably an organic solvent, such as alcohol is used to accelerate the reaction with the water in the wood. Here, the hydroxyl (OH) group on some or all of the cellulose molecules is partially replaced with silicon or an alternative atom or molecule to changes the character of the wood. The process may be modified to insert a preliminary step of adding a reactive agent to be locked into the wood. Manufacturing techniques to enhance the process using ultrasound or other wave generating techniques are also taught.

25 Claims, 19 Drawing Sheets

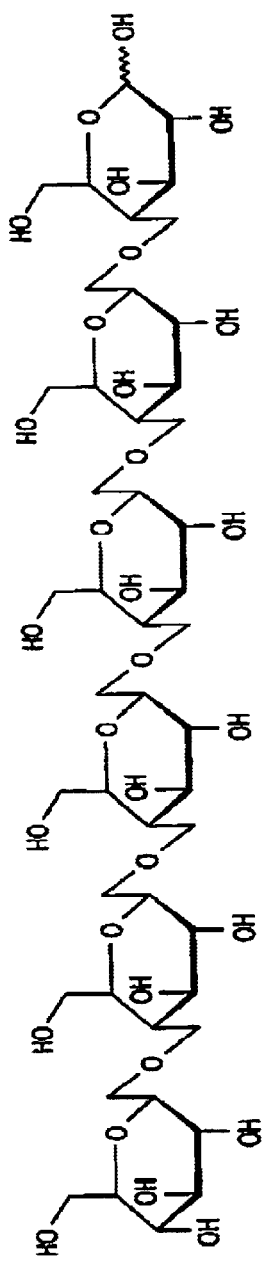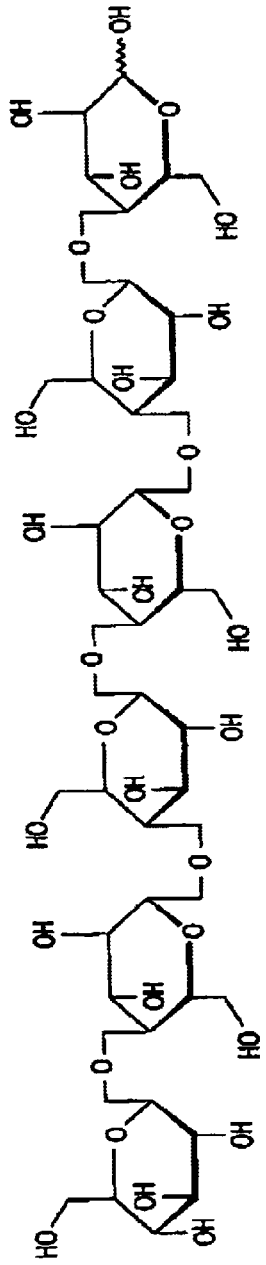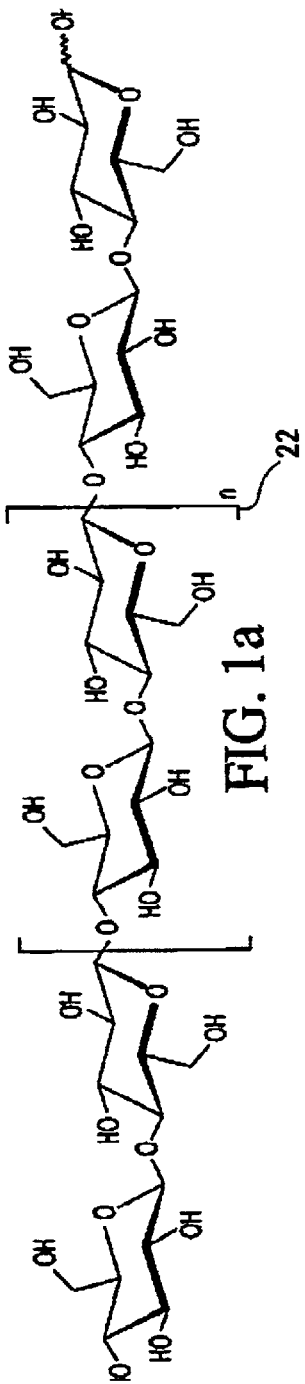

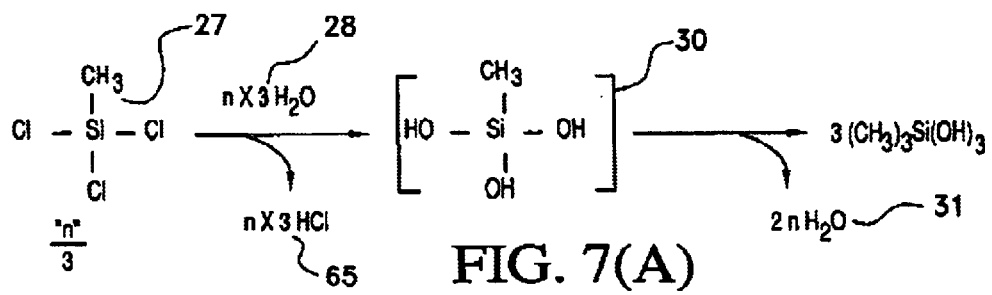
FIG. 7(A)
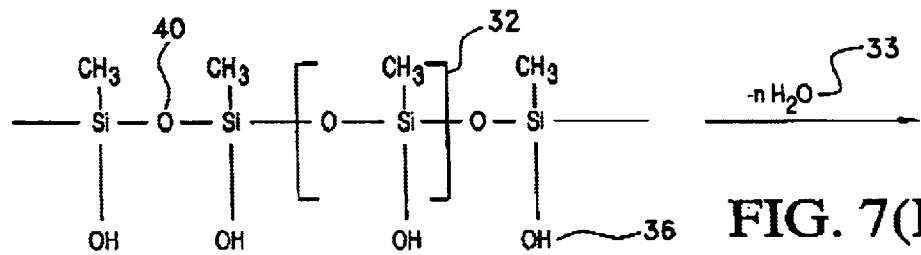
FIG. 7(B)
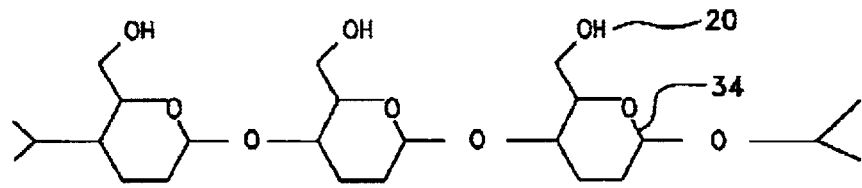
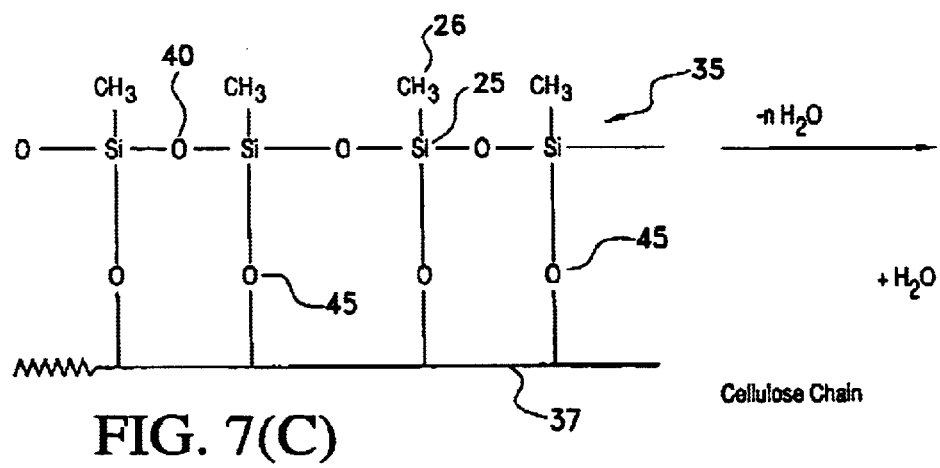
FIG. 7(C)

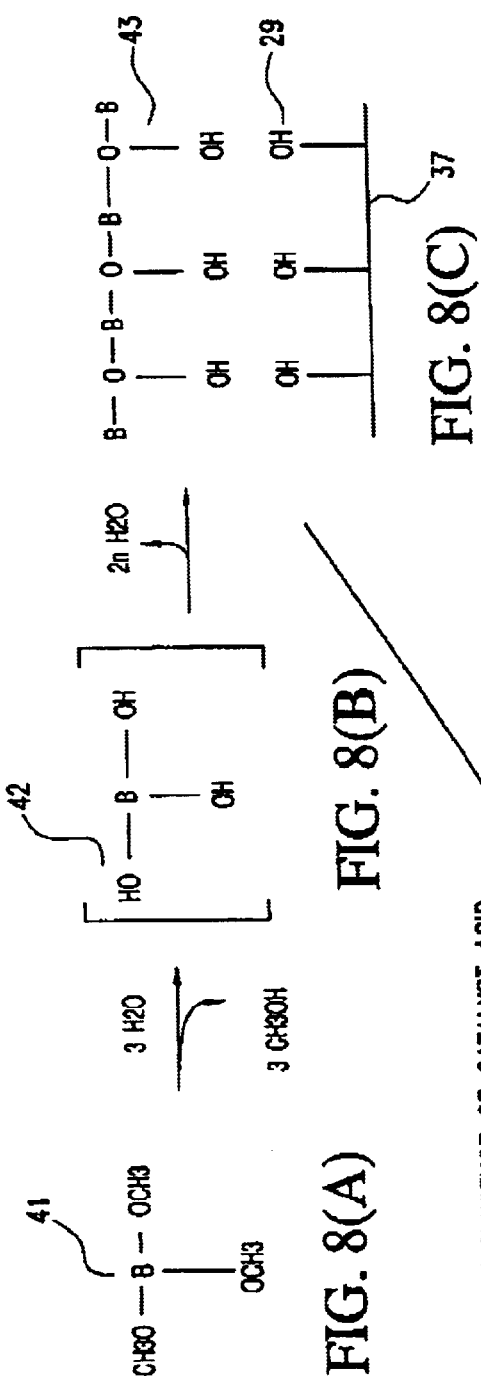

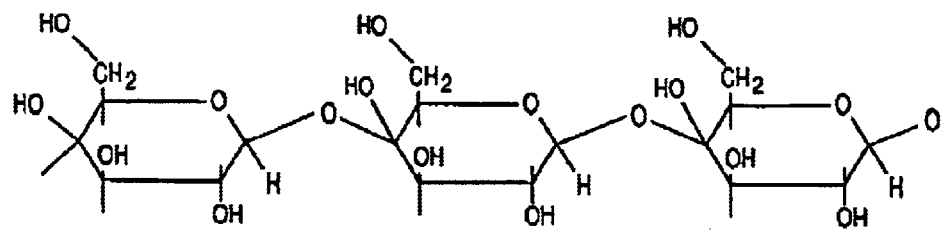
FIG. 12(A) Cellulose
$B(X)_3$; X=-OR; Halogen; -OH
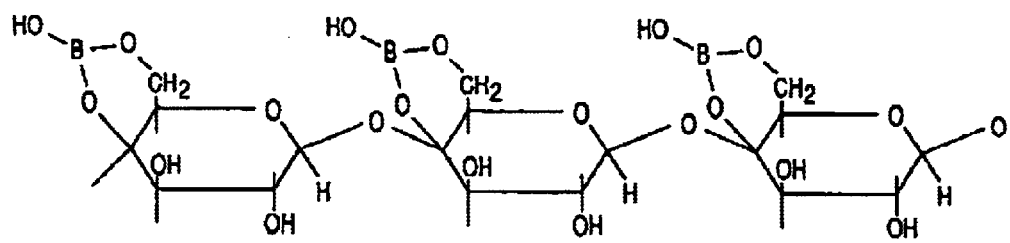
FIG. 12(B1) or
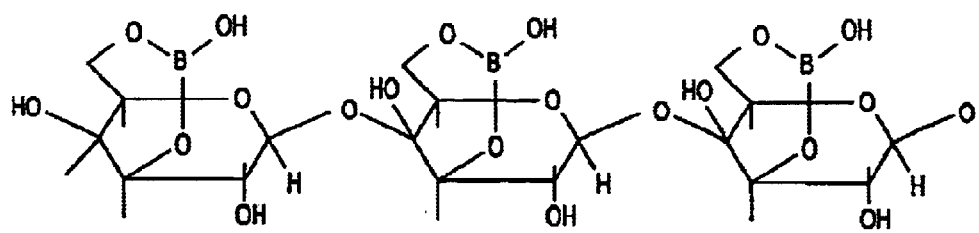
FIG. 12(B2)

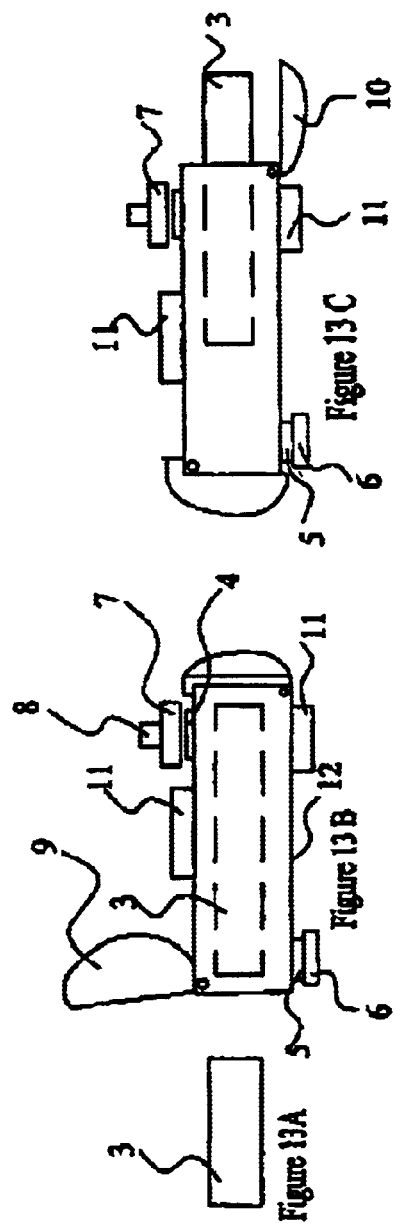
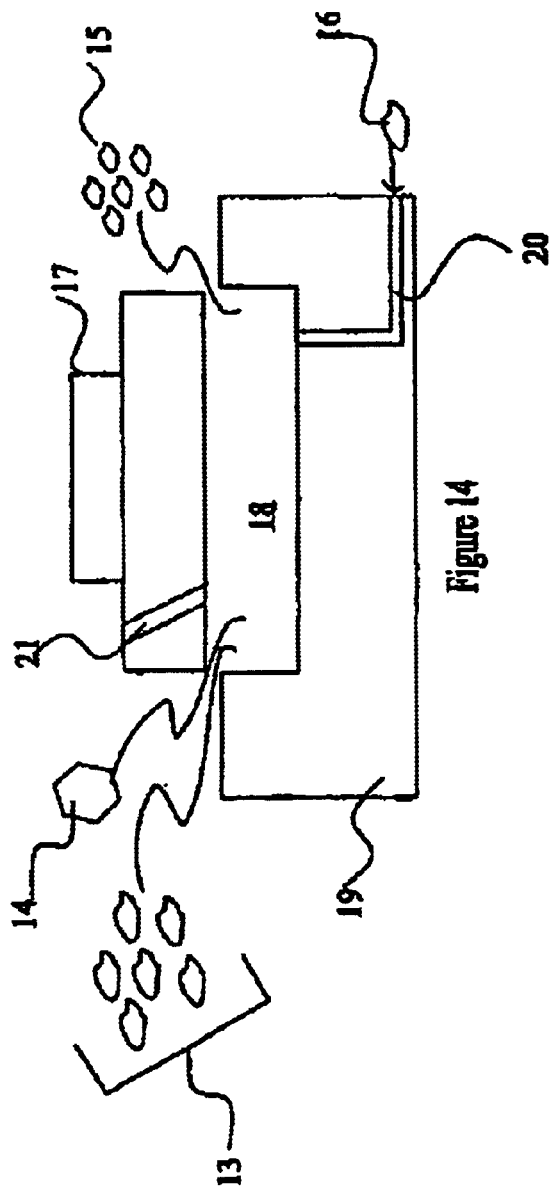

PROCESS FOR TREATING WOOD AND PRODUCTS FROM TREATED WOOD

CROSS-REFERENCE TO RELATED APPLICATIONS

This patent is a continuation in part of patent application Ser. No. 09/885,642 filed Jun. 20, 2001, which is the non-provisional application of Provisional Patent Application No. 60/213,198 filed Jun. 21$^{st}$, 2000. It is also a CIP of utility patent application Ser. No. 09/788,165 filed Feb. 15, 2001 and now abandoned.

BACKGROUND OF THE INVENTION

1. Field of the Invention

The present invention relates to the treatment of wood. The invention relates to the treatment of wood in such a way that the chemical structure of all or part of the cellulose is altered to preserve the wood.

2. Description of Related Art

Past wood treatments consist of various chemical and dry kiln loading and unloading techniques for wood. The cellulose of the wood is a reactant of the present invention.

Scientists and researches have been seeking an effective silicon based wood treatment for decades. Studies have suggested that silicon is effective in the treatment of wood. Difficulties have arisen, however, in how to effectively transport the silicon into the wood and keep it there.

Wax resins have also been attempted with unsatisfactory results. Boron compounds may function as insect repellents and may be used in the treatment of wood products. The biggest drawback of the use of boron in the treatment of wood is that it leeches out of the wood too quickly. This leeching has the detrimental effect of leaving the treated wood in a poorly protected state after a relatively short period of time.

Current wood treating techniques require that the wood be dried prior to the treatment process. If the wood is naturally "wet" (or green) the carrier is less efficiently absorbed and cannot effectively distribute the treatment chemical. Wood may also be wet from external sources such as storage, transport, cleaning, weather, etc., and require drying.

Such drying may be accomplished in a variety of ways and at significant expense. Larger wood pieces (i.e. railroad ties, utility poles, timbers, etc.) are typically "air dried". This process requires that the wood be stored in vast lots where it will naturally dry due to exposure to the sun and air. In addition to the costly management, there is the cost of inventory. Most wood that is air dried is required to sit idle on a lot for 6–12 months. The financial burden of having to carry these enormous inventories of dormant wood has been estimated at nearly $100 million annually for the railroad industry alone.

Another common drying technique is kiln drying. This is a significantly faster process than air drying, but the expense involved in the construction of the drying buildings and the energy utilized to force the wood to dry is significant. Cut timber needs to be kiln or air dried to a level of approximately 14–20% moisture level prior to treatment with existing technologies. This process is costly in terms of time (air drying) or money (kiln drying) and adds a significant cost to the overall treated product. The drying process is necessary to support transport of the carry of the chemicals and provide open volume to accept the treatment solution. A "green" piece of wood will not allow a prior art treatment carrier to enter to an acceptable level.

The treatment methods most commonly used today utilize oil (in the case of creosote) or water (in the case of Chromated Copper Arsenate (CCA)) as the carrier to deliver chemical into the vessels and voids of the wood. These carriers are used with force to place chemicals inside of the wood to treat the wood. There is little or no chemical interaction or reaction with the cellulose of the wood itself. Several factors affect the levels of benefit to the treated wood using current methods including:

The concentration of the chemical in the carrier;

The pressure exerted on the treatment solution to "force" it into the wood; and

The amount of time the wood remains under pressure during the treating process.

These variables can be adjusted to produce different "grades" of treated wood for different end products. For example, a piece of dimensional lumber will not normally be as thoroughly treated as a railroad cross tie which will be in direct contact with the ground, or common outdoor decking. Typically, the higher the concentration of chemical to its carrier and the longer the treating time the higher the overall cost of treatment.

Water and oil carriers are poor carriers. While they carry the chemical into the wood they also have detrimental effects and reduce the quality of such treatments. A standard cubic foot of untreated wood will absorb as much as 3.5 gallons of water or oil during a normal treatment process. The carrier water or oil remain in the wood adding weight without providing additional treating value. Over time or under changed conditions from those during treating, such carrier may escape the wood and degrade treatment quality. Further, the effect of such carriers contained in the wood over time on the desired treatment or quality of the treated may be varying.

U.S. Pat. No. 5,652,026 to Saka discloses a water based treatment based on the creation of oligomers outside of the wood.

Polish Patent 148704 to Maciejewski teaches the use of a mixture of methylsiloxane, phenylsiloxane and vinyltrichlorosilane in toluene with subsequent curing to make a coating on metal, concrete or wood. The mechanism of this coating involves co-polymerization of the vinylsilane with the siloxanes on curing on the surface of the metal, concrete or wood. The reagent does not react with the metal, concrete or wood but forms a coating on the surface only.

A paper by Stabnikose titled "New Methods of Wood Preservation" discloses the use of organic solvents which are non-hydrophillic and do not allow adequate penetration and retention of silicates in the wood.

Non-hydrophilic organic solvents, such as gasoline and benzene do not mix with water [being highly hydrophobic] and therefore a 5–10% solution in benzene would not penetrate the interior of wet wood. There would be considerable evolution of hydrogen chloride gas that is injurious to workers, environment and damages wood with the benzene.

Nasheri, U.S. Pat. No. 5,871,817 is correct in teaching that boron is introduced into wood, but not bonded in the prior art. It is indicative of the failure of prior art to use boron with bonding reagents. Nasheri is also relevant in that it shows a method in the prior art of introducing additives in the wood. If this type of invention is practiced in advance of the process taught in this application, the boron may be trapped in the wood improving the longevity of the wood product once it is exposed to environmental pressures.

Historically certain treatments have been taught in the treatment of cellulose but only after it is extracted from raw wood and the present invention seeks to improve on that by describing a method and a specific product which can be utilized and created in order to change the structure in native wood, chip wood derivatives, a living tree, in timber, poles or wood composites.

BRIEF SUMMARY OF THE INVENTION

Applicants have invented a solution for use in treating wood and wood products. The solution is comprised of reactants which chemically react with wood and its constituents. When the solution comes in contact with wood, a reaction occurs between the reactive components of the solution and the wood cellulose resulting in a reaction product improving the wood's strength and durability while simultaneously rendering the wood resistant to water, fire, rot, fungus, insects and many other environmental factors.

Prior to Applicants' invention, there has been no way to satisfactorily have the chemicals remain in the wood for extended periods of time. With Applicant's invention, the desired chemicals are absorbed into and become part of the wood. Chemical equivalents may also be used.

The carrier for Applicant's invention works with the molecules of the wood. Applicant's invention is drawn into the wood along concentration gradients and by other physical processes which result from the reaction of reactants with the molecules of the wood. The reactive chemical of Applicant's invention reacts with the molecules of the wood and may displace the water and other liquids inside the wood. Thus, through the chemical's molecular reaction, of a tough, highly resistant polymer product (referred to as a matrix or shield) results. Because the wood draws Applicant's invention into the wood, there is no need to use high-pressure to treat the wood. This is a drastic departure from the century old process of utilizing high pressure to force various chemical and treating compounds into the wood.

Because Applicant's invention is drawn into the wood, it may be employed on a "green" piece of wood. Applicant's invention, in a departure from earlier technology, is effective on wood and wood products that are not dried or bone dry. The presence of moisture in the wood, or wetness in the wood, provides beneficial effects in the utilization of this invention. The chemical reaction of Applicant's invention is accelerated by the reaction or mixture with the water and other natural liquids inside a piece of wood. The Applicant's invention is drawn into wet wood, participates in reaction and may expulse the excess water and other liquids originally contained within the wood. It can act as a combination treatment and water displacing (i.e. drying by water volume replacement) process in one step. Applicant's invention can be considered for demonstrative purposes as displacing some of the volume of the liquids present in the wood or wood product and replacing that displaces volume with its own. Applicant's invention may drive out fluids of the wood to allow for its own impregnation into the wood and reaction with the wood and wood constituents. If so, the waters may be removed from the solvents as an additional step in order to prevent these from slowing or stopping the reaction.

The applicant's invention is a heat generating, exothermic reaction driven to completion by the products used and the method in which they are introduced into the wood from the hydrophillic organic solvent into the moisture of the wood.

Upon treatment with Applicant's invention, water and other liquids are less able to enter the wood. With the molecular change in the wood's natural liquids and the creation of a protective polymer which may be produced throughout the woods thickness, the wood is naturally and permanently, protected from water; rot; insects; decay, etc.

Tests show that wood treated with Applicant's invention in its preferred embodiment is:

Waterproof,
Decay resistant,
Insect resistant, and
Stronger than before treatment.

Applicant's invention has been able to incorporate all of the benefits attributed to both silicon and boron, individually or in combination, and lock those benefits within the wood. By using the natural liquids of the wood to "pull" or enable transport of the chemical into the wood while allowing the simultaneous reaction of Applicant's reactants with the wood cellulose, Applicant's invention displaces these liquids with the molecules of boron and silicon and creates a polymer "shield" based on the matrix defined by the cellulose polymers to encapsulate or affix a bond to the solids thereby providing protection to the wood.

The result is a wood product that is nearly "petrified" and that strongly resists water, rot, insects and other ailments common to wood. Water "beads" on top of wood treated with Applicant's invention.

This same treatment disclosed in the preferred embodiment works on aftermarket wood products such as paper products, wood composites, and other cellulose paper products.

Current treatment processes require an additional chemical and treatment process to provide a minimal level of fire retardant. Applicant's invention can be enhanced to impart fire retardancy. This enhancement does not require any additional conventional equipment and can be completed as part of the application of inventive process by adding fire retardant chemicals as part of the reactants or by adding fire retardant chemicals before the other reactants are added. Existing treatment processes require that different wood products be treated at different levels depending on the specifications of the end use of the wood product. These different levels are primarily measured in pounds of solid chemicals per cubic foot of wood. In this manner a wood product used above ground, will in past art, have less chemical via the treatment process than one intended as a permanent wood foundation.

Products produced with Applicant's invention may provide environmental health and safety benefits. On the environmental front, many within the industry recognize an obligation to protect the environment.

Wood treated with Creosote must be handled very carefully because of toxicity. Railroad workers, utility pole workers and others who handle creosote treated wood register complaints of swelling hands, sores and blisters from contact. Applicant's invention treated wood is safe and can be handled without gloves or other protective equipment after it has been treated.

Though claimed to be environmentally clean, wood treated with Creosote or CCA must be disposed of according to very specific guidelines so as not to harm the environment. There are no such regulations expected for Applicant's invention.

Applicant's invention allows wood to be treated without altering the shape of the wood or causing swelling. The chemical can also be used as an after-market treatment product. The after-market product will be slightly different than the commercial product, typically in its level of strength. This is important since many existing structures and wood products can receive the benefits of Applicant's invention. Anticipated after-market examples include treating wood frame houses to control termite and/other bug infestation; treatment of previously installed railroad ties;

utility poles; decking, etc. such that they receive the benefits of Applicant's invention.

There is a strong market need for Applicant's invention. The wood industry produces approximately 90 billion board feet that currently is not treated or is treated in an ineffective manner. The benefits of wood as a material are recognized and the need for better, and more efficient wood keeps growing. Wood used in specific market segments such as the construction of mobile homes, wood decking in tractor trailers, and all wood or wood products allowing the Applicant's invention reaction will benefit significantly from a wood treatment that would render the wood waterproof; fire retardant; insect and decay resistant.

The inability of the treating industry to penetrate more than 10% (+/−) of the wood industry due to the severe limitations of the current treating processes has created a desire to discover new methods of treating that will provide the benefits required by the industry.

Another use for Applicant's invention is in the manufactured wood segment of the market. Manufactured wood is comprised primarily of Oriented Strand Board (OSB) and Particle board. There are two significant drawbacks to manufactured wood, however. First is its level of fire retardant. While acceptable for many uses it does not have a high enough fire retardant level to be used in as many places as the market requires. Second is its negative characteristic of swelling when it comes in contact with water.

Using Applicant's invention as a treatment for manufactured wood products or for the raw material used in manufactured wood would solve these in some applications.

Applicant's invention reacts with the natural components of wood. The end result is a piece of wood that has superior resistance to water, fire, rot, insects, etc.

Current treatment processes use oil, water or other carriers to transport treating chemical into the wood. A significant portion of these carriers remain in the wood often causing swelling and/or warping of the wood. Applicant's invention causes no such alterations.

Unlike current treatment processes, wood treated with Applicant's invention does not gain significant weight. This is due to its unique nature of using the liquids within the wood as the agent to react and carry the chemical into the wood. Current treatments use oil, water or other carriers to transport chemicals into the wood. These carriers themselves remain in the wood adding as much as 25 pounds to every cubic foot of treated wood. Wood treated with Applicant's invention has a small or even weight gain based on a theorized replacement of certain liquids in the wood and the lack of heavy molecular additives in many embodiments. Equally important, the reactants are drawn out of the solvents so that no liquid solvent is added to the wood.

Whether treated after the manufacturing process or by treating the wood components prior to manufacture, Applicant's invention is an excellent treatment for manufactured wood products.

Applicant's invention reacts with aqueous liquids in wood and its constituents. The chemical reaction may also produce a discharge, such as HCl which can act as a catalyst for the propagation with non-halogen reagents. One step in the process may include the neutralization of generated by-products. Smaller amounts of acid may be used as catalysts for non-acid generating chemicals in the embodiments.

Because wood treated with Applicant's invention goes through a chemical change, the treatment alters the molecules of the wood to create a new molecule holding the silicon and the boron compounds within the wood in a matrix defined by the cellulose polymers in the wood and other wood products which react with the reactants, as a reacted product or as part of a polymer shield. Unlike currently known technologies, the level of leeching of the chemical is reduced due to the fact that it is encapsulated within or bound to the wood itself in varying degrees based on the treatment techniques employed.

Though the molecular change that occurs in the treatment process changes some of the molecular components of the wood, it does not change the structural character of the wood detrimentally. It hardens the wood through the creation of the polymer matrix or shield. This polymerization acts as a kind of "plastic". Depending on formulation it may increase or decrease the flexibility of the wood while strengthening the wood.

All wood can be treated with Applicant's invention. Hardwoods, softwoods and man-made woods accept the treatment. In current treating processes there are different treatment levels, treating times and/or chemical dilution levels that may be employed.

One variation for treatment using Applicant's invention considers the percentage or amount of liquid within the wood being treated (i.e. "green" vs. "dried"). Less liquid in the wood requires slightly more time and pressure than wood with a higher presence of liquid.

Because of the molecular change in the wood and the creation of a polymer matrix or shield, wood treated with Applicant's invention is especially well suited for in-ground and/or underwater use. Applicant's invention Treated Products resist the effects of salts, minerals and water.

Wood treating as known in the current industry follows a long and expensive path. The path a standard 2"×4"×8" pine stud would follow from forest to market in the treating process currently in use as compared to the process required with Applicant's invention is shown below. The overall treatment process utilizing Applicant's invention is significantly faster and more economical than current treating processes.

Current treating processes necessitate that the wood absorb a great deal of the chemical and the carrier (i.e. water or oil) which significantly increases the weight of the wood.

Current Treating Method:

(a) A tree is felled and hauled to a sawmill;

(b) The tree is milled into rough wood pieces slightly larger than the finished product;

(c) The rough wood is kiln dried so as to remove up to 85% of the moisture content of the "green" wood;

(d) The rough, dried board is milled again to trim it to its finished size;

(e) The rough, dried board is treated by immersion into a highly pressurized (120 psi) cylinder filled with a mixture of water and a treatment chemical ("CCA"). The treating process typically lasts from 15–45 minutes;

(f) A 2"×4"×8" pine stud contains approximately 4.5 board feet of wood. The stud will typically absorb about 1.3 gallons (approximately 10 pounds) of liquid (chemical and carrier) as a result of the treat process;

(g) The cylinder is drained of chemicals and a vacuum is created within the cylinder remove excess chemical from the wood and the boards are removed;

(h) The treated board is sent to be kiln-dried;

(i) The dried, treated, finished board is shipped.

Contrary, the Process of Applicant's invention with the common productive process reveals several differences.

Applicant's Invention Treating Method:

(a) SAME (b) SAME (c) NOT REQUIRED (d) The rough, "green" wood is milled again to trim it to its finished size.

(e) The board is treated by immersion into a slightly pressurized (15 psi) cylinder filled only with Applicant's invention. The treating process requires 5–10 minutes;

(f) Due to the molecular reaction of Applicant's invention and the wood's natural liquids, the wood may in certain embodiments expel liquid while absorbing sodium silicate and borax. The treated wood weighs approximately as much after treatment as before;

(g) The boards are removed;

(h) NOT REQUIRED (i) Since little or no liquid carrier was absorbed by the wood treated with Applicant's invention, the treated stud weighs only as much as it did prior to treatment approximately twice as many studs can be loaded on a single truck cutting transportation costs.

Some of the unique properties of Applicant's invention include:

(a) Applicant's invention reacts with the molecules and natural liquids (mainly water) of wood to draw the reactants from an organic solvent;

(b) Applicant's invention does not require high pressure, to force chemical into wood added or bent to react the reactants with the wood;

(c) Applicant's invention is able to treat green wood as well as dried wood;

(d) Wood and reacted with applicant's invention is environmentally clean;

(e) Since it becomes "part of" the wood itself the chemical does not leach out of the wood;

(f) Applicant's invention can be used as an after-market treatment of existing wood;

(g) Since little or no carrier is introduced into the wood, Applicant's invention does not cause swelling of the wood;

(h) Applicant's invention can be used in the treatment of OSB and other man-made wood products; and (i) Applicant's invention may be modified to introduce borax and sodium silicate into the wood molecules thereby providing significant water, fire, rot and insect protection.

The Chemistry of Applicant's Invention

The primary method disclosed herein would be to react the cellulose and/or other chemicals within the wood so that all or part of these reactants are altered chemically.

One of the primary ingredients in wood is cellulose which can be described as a chain of linked glucose units (FIG. 1). Cellulose is generally a six carbon and one oxygen chain as shown in FIG. 1. There are repeating units (n) so that a consistent structure is indicated.

Cellulose has an average degree of polymerization, dependent on the source, typically between 3,500 and 12,000 units although a lower degree of polymerization is found in wood pulp which has been treated.

Historically wood treatment involved covering or submerging the wood or to imbue the voids of the wood with a substance blocking the entry of elements or to discourage insects from destroying the cellulose component of the wood.

Applicants' invention in one embodiment involves the treatment of the wood with a reactive silicone (preferably) donor which preferably uses a carbon silicon alkoxy groups in conjunction with a pro-catalyst comprising of a carbon silicone halogen combination which replaces some of the molecules or atoms within the cellulose structure with silicon molecules. As shown in FIGS. 2 and 3, the hydroxyl (OH) groups 29 on some or all of one or more of the cellulose molecules are reacted with silicon molecules from the solution of carbon-silicon-alkoxy groups, here tri-methyl chlorosilane. Different diluents may be utilized and different chemicals may be added to change the degree of polymerization, the fire retardant features of the wood, to change the insect resistance, to change the water retention features and the like.

These and other objects and advantages of the invention will become better understood hereinafter from a consideration of the specification with reference to the accompanying drawings forming part thereof, and in which like numerals correspond to parts throughout the several views of the invention.

BRIEF DESCRIPTION OF DRAWINGS

For a further understanding of the nature and objects of the present invention, reference should be made to the following detailed description taken in conjunction with the accompanying drawings in which like parts are given like reference numerals and wherein:

FIGS. 1A, 1B, and 1C are alternate views of the structure of the cellulose of wood.

FIGS. 7(a–c) shows the most likely reaction with a silicon donor.

FIGS. 8(B1) and (B2) shows alternative intermediary boron molecules which may be generated in the process.

FIG. 12 shows a similar reaction to that shown in FIG. 11 with a boron molecule substituted for the silicon molecule.

Alternative embodiment are shown as B1 and B2 where two hydroxyl groups on the cellulose which are replaced.

FIG. 13 shows a block diagram of a process to treat wood.

FIG. 14 shows a block diagram of a process to form particle board.

Figure 15:
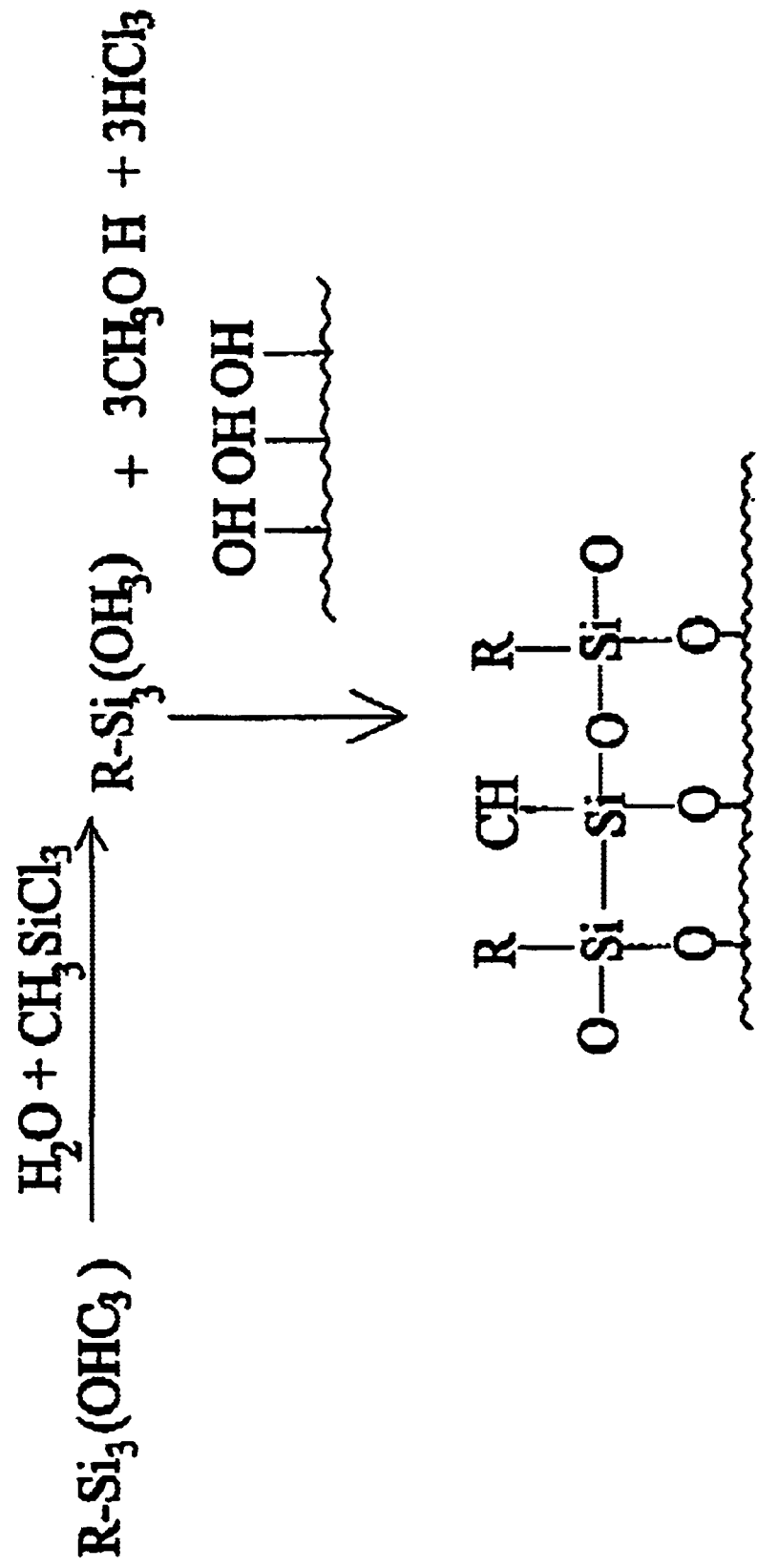

FIG. 15 shows the process utilizing a catalyst.

Figure 16:
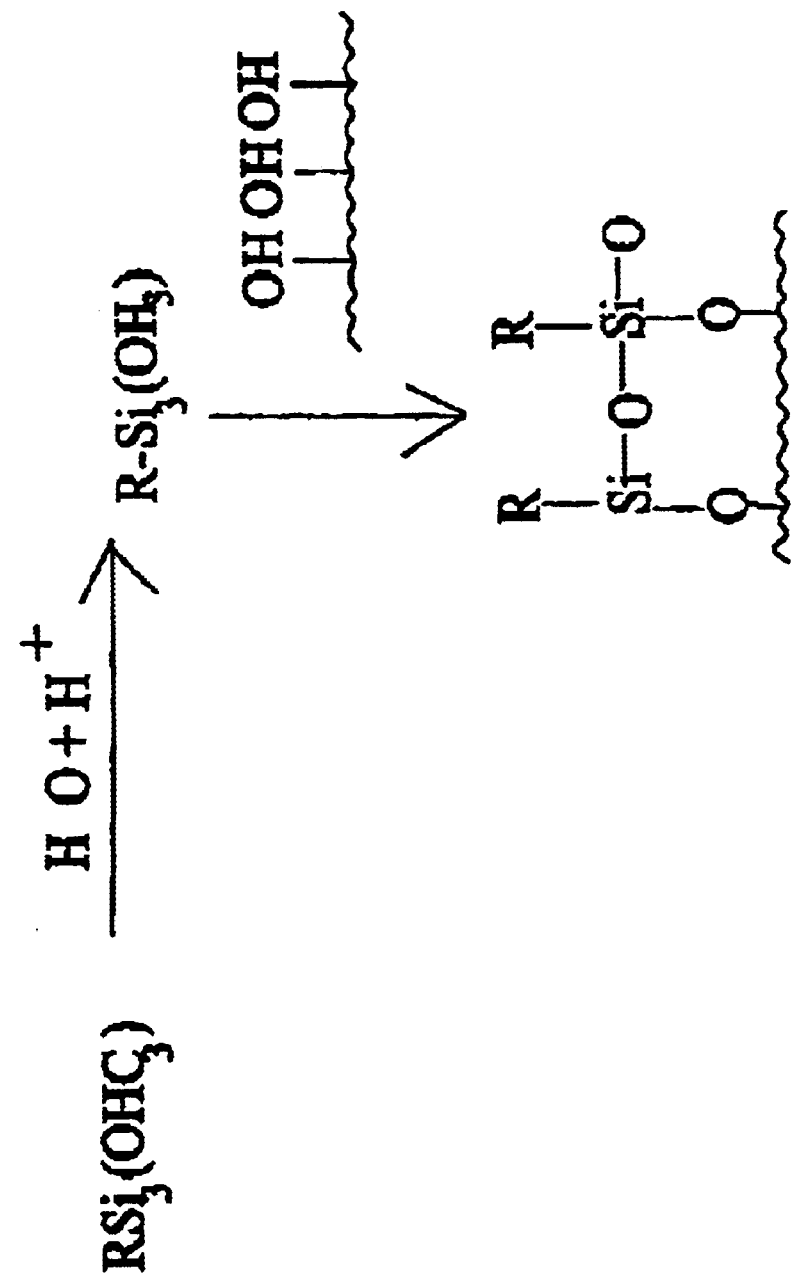

FIG. 16 shows an alternate embodiment of the process of claim 15 where the catalyst is acid.

FIGS. 17a–e shows a view of the wood as it's exposed to a catalytic and non-catalytic reactant of the type taught here FIGS. 18–21 show test results of wood exposed to the chemical process taught herein.

DETAILED DESCRIPTION OF THE INVENTION

The present invention modifies wood by modifying the hydroxyl groups (29) of cellulose. This is, in the preferred embodiment, catalyzed by using an acid or by creating an acid during a reaction with the cellulose or water within the wood with a pro-catalyst.

Figure 6:
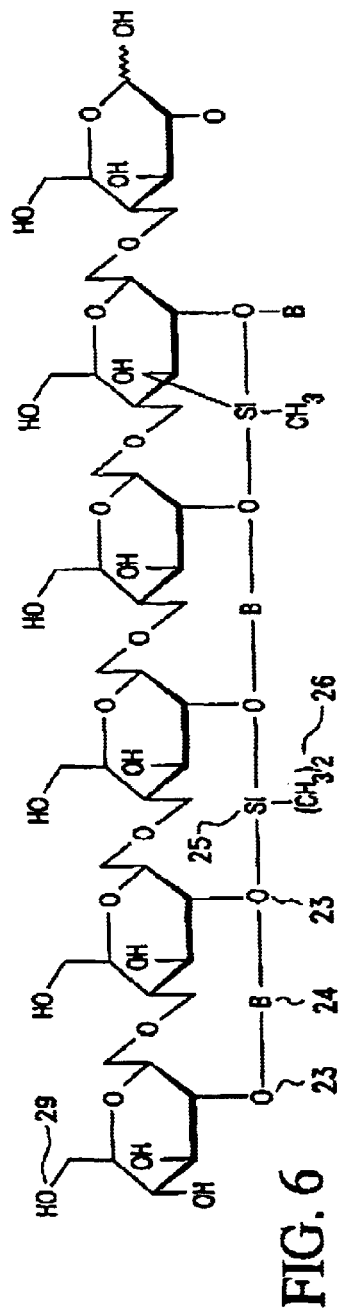
FIG. 6 shows a representation of cellulose.
Figure 6A:
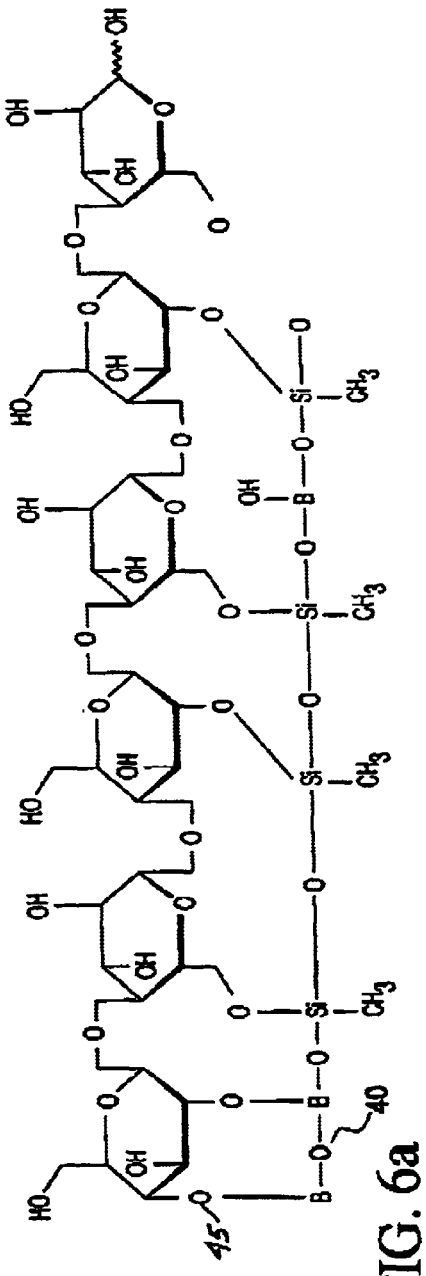
FIG. 6a shows one theoretical model for products by the process taught herein.

As can best be seen by reference to FIGS. 1A–1C cellulose, a main constituent of wood, can be drawn as repeating series (n) of cellulose units having hydroxyl groups shown as 22 in FIGS. 1A and 6A (a modified cellulose molecule). FIGS. 1A–1C show typical representations of the same structure in slightly different formats.

As can be seen by reference to FIG. 2, one method of modifying the structure of the wood would be to introduce tri-methylchlorosilane $(CH_3)_3SiCl$ (60) to the cellulose molecule to create modified cellulose with the alkyl silicate bonding across the hydroxyl group (oxygen-silicon covalent bonds) and creating an acid which can further catalyze the reaction with non-pro-catalyst as discussed in more detail below.

Figure 2:
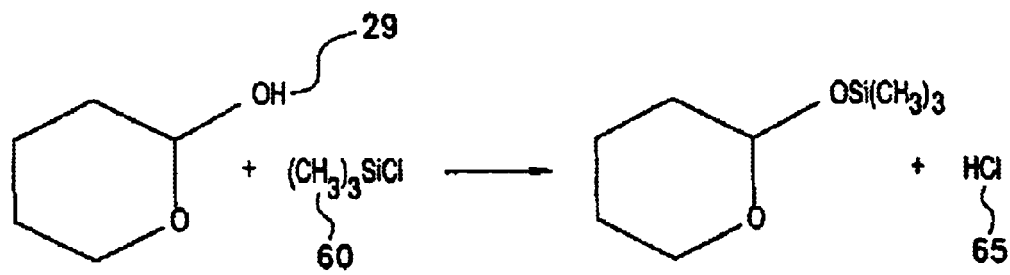
FIG. 2 is a view of a chemical process for altering the cellulose structure of wood showing one method of altering the structure of a single strand of cellulose.
Figure 3:
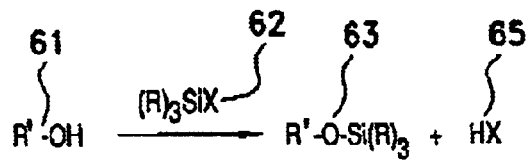
FIG. 3 shows a generic representation of the formula shown in FIG. 2.

As can be seen by reference to FIG. 3, and as discussed in more detail below, the representative molecule shown in FIG. 2 is a derivative of a hydroxyl reaction involving the use of any compounds reactive with the hydroxyl group in the presence of acid or acid by pro-catalyst.

The present invention allows for the creation of a series of molecules from cellulose in preferably wet raw wood products and wood composite products. The process sequentially aligns the molecules as shown in FIG. 6 below. In FIG. 3, a generic hydroxyl compound 61 is reacted with a generic tri-alkyl silicon halide to yield (in the presence of water (64) in the wood) a modified molecule (63) which is more hydrophobic and acid (65) which acid (65) can act as a catalyst to continue the reaction as described in more detail below with reference to FIG. 15.

Figure 4:
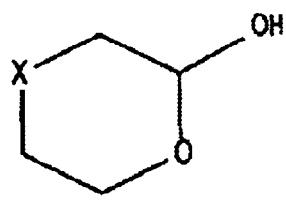
FIG. 4 shows one unlikely alternate structural cellulose target.
Figure 5:
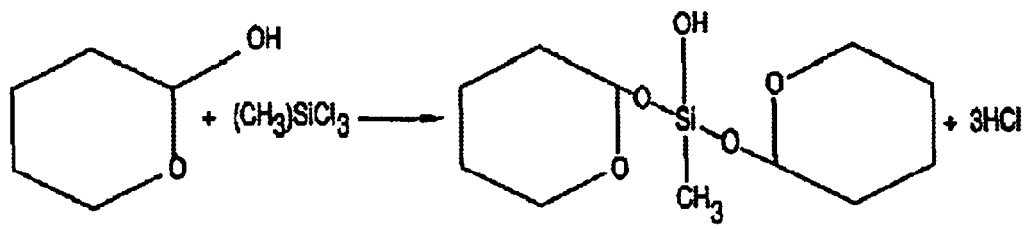
FIG. 5 shows an alternative unlikely target for the structure of treated wood.

Silicon or other reactants could, in more violent reactions, be found in other locations in the wood as shown in FIGS. 4 and 5, but these are more extreme examples and are less likely to occur within the framework and are shown as potential by-products which are theoretically unlikely to occur.

FIG. 6A shows a less likely structure for the molecular bonding where the cellulose in the preferred embodiment may contain, by exposure to silicone and boron reactant molecules and solutions, a limited replacement of the hydroxyl groups with boron and silicon becoming a part of the silicon chain. Hence, one product which is claimed by the invention which is a cellulose chain modified to have a bond between hydroxyl oxygen atoms (23) boron atoms (24), silicon atoms (25) or other hydrophobic or anti-degrading elements.

Hydrophobic elements which prevent the reaction include waters and organic solvents which have a Kow greater than 10. Degrading elements, such as high concentrations of the acids which are generated by the pro-catalysts may be offset by anti-degrading elements such as pH balancing bases or other chemicals able to eliminate the acidity.

As can be seen by reference to FIG. 6A, these silicon atoms preferably have alkyl groups (26) attached to form alkyl silicates. It is taught that these alkyl groups may be varied according to the disclosure set forth below or may be replaced with equivalents.

Figure 6B:
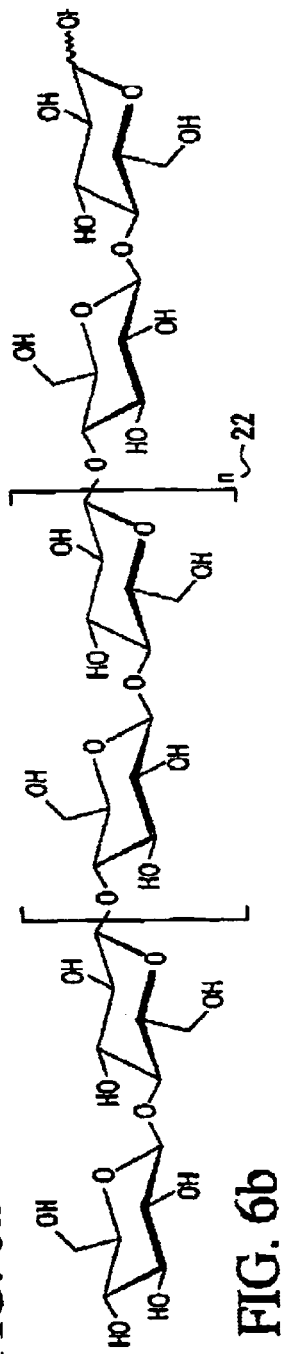
FIG. 6b shows what the inventor thinks is the more likely product generated by the process taught herein.

FIG. 6B illustrates the expected end product involving the bonding across the oxygen (45) hydroxyl groups (29) of the cellulose (37) of atoms or molecules (here boron or alkyl silicates) with the outer valence shells being competed across oxygen molecules (40) between the atoms or molecules. FIG. 6B also shows how it is possible that the binding would be less organized than that suggested in FIG. 6A and that there may be bonding across more than one hydroxyl group in a single cellulose molecule within a chain of repeating units (shown again in FIG. 6C as n repeating units. The exact alignment can vary and may be different according to the reactants used. One key fortune of the invention shown in these Figures is the ability of this process to allow for proper alignment of individual reactant monomers and trivalent, tetravalent and pentavalent atoms withing the reactants to bond with the wood cellulose structure.

A molecule which can undergo polymerization, thereby contributing constitutional units (the single trivalent, pentavalent and tetravalent atom constitutional units (e.g. $MeCl_3Si$-methyltrichlorosilane)) in this invention can be referred to as contributing constitutional units or functional units or functional groups of the polymer or oligomer (e.g. the cyclic Silanes as described formed after the functional groups are reacted within the wood) to the essential structure of a macromolecule is a monomer. An oligomer is molecule of intermediate relative molecular mass, the structure of which essentially comprises a small plurality of units derived, actually or conceptually, from molecules of lower relative molecular mass, i.e. the monomers described herein. Similarly, the polymer definition of a molecule of high relative molecular mass, the structure of which essentially comprises the multiple repetition of units derived, actually or conceptually, from molecules of low relative molecular mass, i.e. the monomers herein described as coming from independent trivalent, tetravalent or pentavalent atoms bonded to the disclosed functional groups or their equivalents.

Also relevant is the polymer properties that in many cases, especially for synthetic polymers, a molecule can be regarded as having a high relative molecular mass if the addition or removal of one or a few of the units has a negligible effect on the molecular properties. This statement fails in the case of certain macromolecules for which the properties may be critically dependent on fine details of the molecular structure. If a part or the whole of the molecule has a high relative molecular mass and essentially comprises the multiple repetition of units derived, actually or conceptually, from molecules of low relative molecular mass, it may be described as either macromolecular or polymeric, or by polymer used adjectivally.

FIG. 7 shows the suspected chemical process of Applicant's invention. In FIG. 7, methyltrichlorosilane is used as a reactant or pro-catalyst to generate an acid catalyst (as discussed in more detail below in reference to FIGS. 13 and 14). There are "n/3" molecules of the catalyst which are drawn out of the hydrophilic organic solvent into the wood to react with "n" molecules of H20 present in the wood to yield "n" times 3 HCl molecules providing an acid environment for catalyzing the reaction of the silicate with the hydroxyl group. This reaction promotes the transport of the reactants into the wood and allows for a greater penetration of the wood during treatment. Aside from generating the acid environment, the pro-catalyst silicate is converted to a hydroxyl form (30) (postulated) which forms a chain as shown at (32) in proximity to the hydroxyl groups coming off of the cellulose ring units (34) and reacts to form the silicate structure. Which oxygen forms the binding oxygen (45) may vary without departing from the inventive concept.

Figure 8:
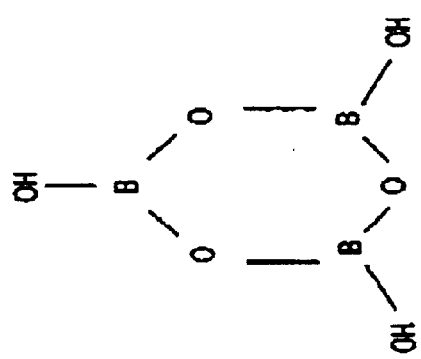
FIGS. 8(a–d) shows an alternate embodiment of the invention.
Figure 8:
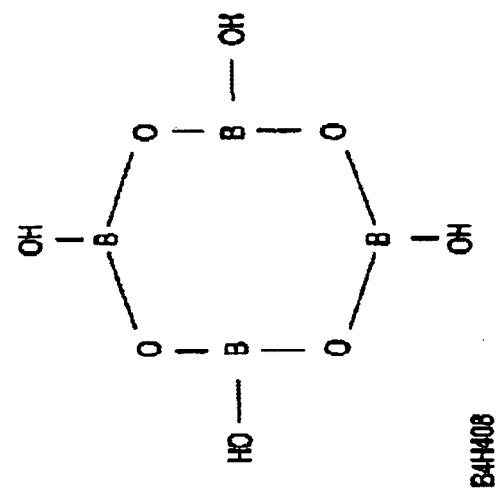

FIG. 8 shows one of two ways boron may be introduced into the wood by Applicant's invention and trapped within a matrix formed within the preferred embodiment. The trapping of boron is particularly helpful since it may lead to insect resistance in the end product. In FIG. 8 it can be seen that a boron compound (41) in the presence of water (from the wood) forms a boron hydroxyl molecule (42) which (in the presence of acid) may polymerize much as the silicate in FIG. 7 to form a boron hydroxyl chain (43) which in the presence of the cellulose binds to form chains (44) in the cellulose matrix. Alternate Borates as shown at (42) or as shown as B1 and B2 may be formed as intermediary or final products which can be trapped in the matrix formed by the silicates shown in FIG. 7 where boron and silicone products are used together or in the matrix postulated as formed by the boron compounds as shown in FIG. 8. Since water cannot get through, the atoms of free borates (borates not forming a part of the matrix) and other additives are effectively trapped within the wood by this treatment.

Bonding may be accomplished using trivalent atoms for bonding although this reaction as shown in FIG. 8 only in the presence of a strong acid or pro-catalyst generating a strong acid.

The process works effectively in the presence of hydrochloric acid or other acid having a pKa of less than 2.5. Boric acid, for example, which may form as in intermediary, would not drive the reaction shown in FIG. 8. The use of pro-catalysts is described later herein, but it may be seen by reference to FIG. 7 where the tri-chlorosilane, as pro-catalyst, yields 3 HCl which acid would drive the reaction. The acid may or may not be referred to as a catalyst. This is also true of the reaction shown in FIGS. 9 and 10 where the trichlorosilane drives the reaction through the production of hydrochloric acid during the solvation of the reactants. While a pKa below 2.5 is preferred, the reaction can be driven by an acid catalyst with a pKa for acid catalysts below 4.00 and pKb for base catalysts above 9.00

Figure 10A:
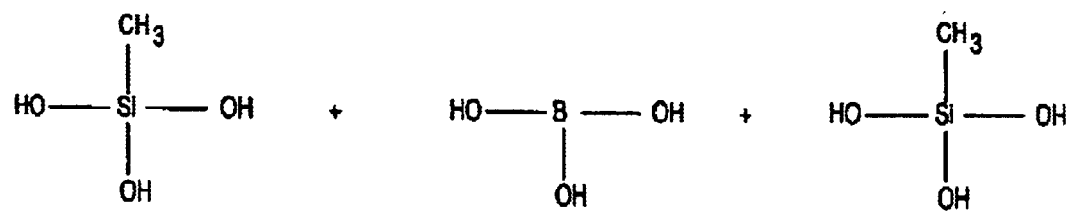
FIG. 10 shows the production of an intermediary (b) and a possible reaction using both boron and silicon (a) to guarantee a polymer with silicon and boron in the modified cellulose structure (c).
Figure 10B:
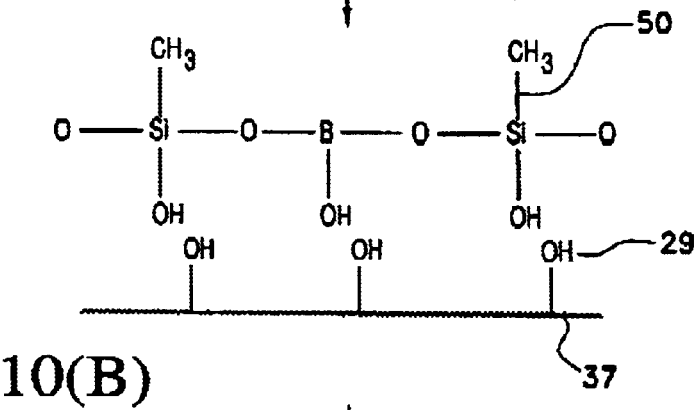
Figure 10C:
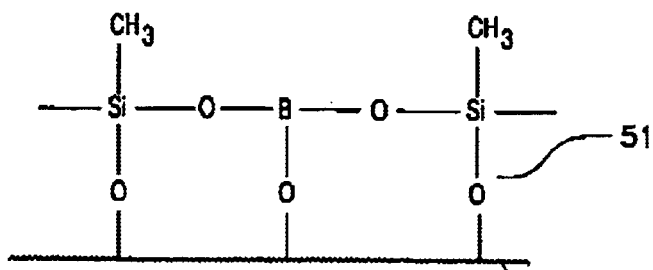

FIG. 10 shows $Si(OH)_3CH_3$ and $B(OH)_3$ from the solvent drawn into and reacted with the wood cellulose using a catalyst which is introduced into the wood as a pro-catalyst (FIG. 7) or otherwise. One other way would be inject a solution with a weak acid concentration (0.1%–0.5%) of strong acid into the wood, but this would be different from the simple transport of reactants where the reactants (trivalent, tetravalent, and pentavalent atoms with an alkoxy component or as pro-catalyst with a halogen component) are drawn from the organic solvent into the wood down concentration gradients and which react exothermicly.

FIG. 10 shows a mechanism for the combination of silicates and boron molecules to form intermediary chains (50) comprised of silicone and boron which in proximity to cellulose (37) forms the modified combination cellulose and boron and silicone molecules (51) which are also those shown in FIG. 6B. While boron and silicon with hydroxy groups are shown, combinations of alkoxy and hydroxy pentavalent, trivalent, and tetravalent atoms with combinations of acids and pro-catalysts.

Figure 11:
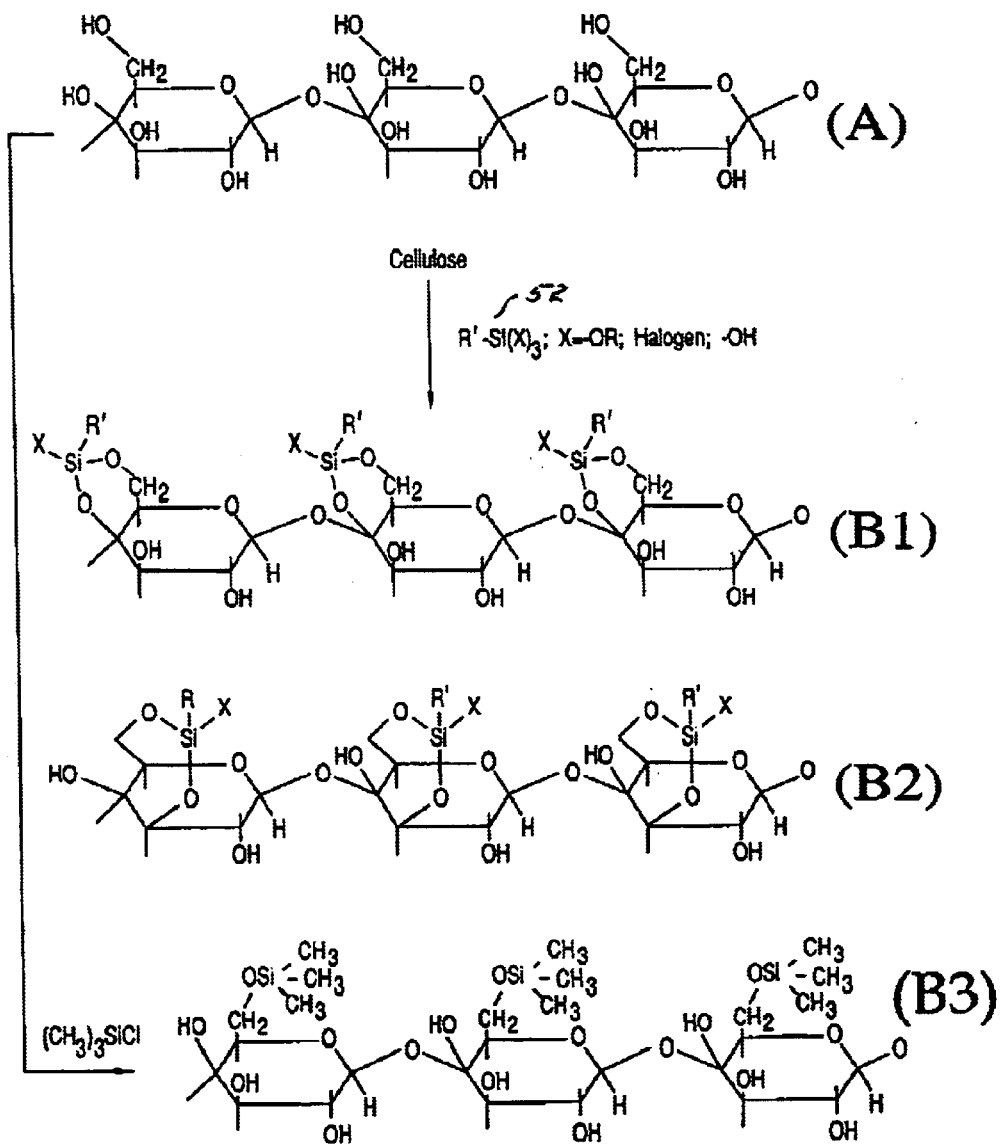
FIG. 11 shows a genuine representation of a reagent with cellulose (a). Here the reagent is generically listed as R—Si—(X)$_3$ where X is an O—R compound and R being an alkyl group; halogen, or a hydroxyl group (OH).

FIG. 11 shows an alternate mechanism for the combination of silicon reagents with cellulose. In FIG. 11 it can be seen that the cellulose is placed in proximity (by way of a carrier solution of the type described in more detail below) with a group $R'-Si(X)_3$ (52) where R' is an alkyl or it's equivalent as discussed in more detail below and X is an OR group (R being a alkyl group from the same generic group as R') or a halogen or a hydroxyl group OH or combinations thereof This reaction shown in step B1 or B2 yields an intermediary (53) or (54) or both intermediaries. These then, in the presence of an acid or acid generated, for example, by the trimethyl chloro silane or other pro-catalyst, yields a more complex molecule where the silicate is combined along the carbon atoms of the cellulose as opposed to the hydroxyl groups as shown at B3.

FIG. 12 shows the embodiment of FIG. 12 where boron compounds (55) are substituted for the silicates of FIG. 11 to yield the end products shown in steps B or C of FIG. 12.

In order to allow for use of more common reactants, it is envisioned, as shown in FIGS. 15 and 16, that a catalyst for the reaction could be provided by acids or molecules yielding acids. In this preferred embodiment, the process includes the steps of:

1) Preparing a hydrophilic organic solvent, for example ethyl alcohol,
2) Adding a silicone donor, such as a one to eight carbon alkyloxy group (methoxy, octyloxy, etc.)
3) Adding a strong acid (hydrochloric, phosphoric or sulfuric acid) directly or, preferably, by way of a pro-catalyst yielding the acid in solution by reaction with the water in the wood such as methyl trichloro silane ($CH_3SiCl_3$). In the preferred embodiment this is preferably an acid solution generated from the pro-catalyst in a concentration of 0.5%, but may range from about 5% to 0.1%. It may also be outside this range with less certain results since the acidity in the wood is not desirable for most uses.
4) Exposing the solution prepared in steps 1–3 to cellulose to allow binding as shown with or without time and pressure restrictions to limit the extent of treatment.

The acid serves, when in contact with the water in the wood, to yield ROH and $RSi(OH)_3$ compounds. The RSi $(OH)_3$ reacts as discussed above with the cellulose to bind in place of one or more of the hydroxyl groups of the cellulose to form the hydrophobic barrier. Alternatively, the protonated silicon donor (protonation by acid generated in situ with the pro-catalyst) reacts directly with the hydroxyl groups of wood molecules (e.g. cellulose) to form covalent oxygen-silicon bonds.

The compound used as a reactant may be an alkoxy group having the formula $R-Si(OCH_3)_3$ with the exact structure of the alkoxy part ($OCH_3$) being subject to any variation within this group of chemicals which performs the desired function shown in the drawings. Free boron compounds in this formulation are expected to have peak efficiency under 2% since the boron tends to counteract the hydrophobic properties of the silicates when the boron is not bound to the cellulose structure. This is an acceptable range since wood treatment generally requires 0.5% treatment with boron to be effective.

Boron may be added as boric acid to the formula effectively in the range of about 0.5 to 5% and is trapped in the silicone matrix. Alternatively, a reactive boron reagent of the type discussed above may be used to form a boron matrix such as that disclosed in FIG. 10 when used in conjunction with a silicon donor and a reactive silicate pro-catalyst other trivalent, tetravalent or pentavalent pro-catalyst structures. Other molecules drawn from the solvent and producing a catalyst in the wood may be used.

In this structure, the acid is in very low concentration (in the case of methyl trichloro silane approximately 0.5%) to the silicone main donor, in this example octyltrimethoxysilane (MTS). This is significant for many reasons, not the least of which is the limitation of the acidity of the end products, the minimization of expensive reactants, the safety of the solution and the lack of toxic emissions.

In one example, that of FIG. 15, the formula is alkyltrialkoxysilane plus alcohol as the carrier plus an acid catalyst plus boric acid as a treatment.

The second example (FIG. 16) might employ the use of $B(OCH_3)_3$ (trimethyl borane) at any percentage depending on the amount of boron desired. In this example the importance of another acid would be to catalyze the reaction.

The acid catalyst could even be in the range of about 0.01 to 10%. The 10% figure is pushing the reaction as a 10% acid would not affect an environmental change 0.01–4.9% is considered a better range. A base catalyst may also be employed, but is less effectively within the same range. Examples are metal alkoxides [eg. sodium methoxide] ammonia, organic bases [eg. triethylamine].

It has been determined that to drive the reaction without an outside energy source in the embodiments tested that the acid should have a pKa of about 2.5 or less.

Methyltrichlorosilane (MTS) is a compound which in this process functions as an acid catalyst on contact with wood cellulose or moisture within the wood. This could be substituted with other alkyl or aryl silicone halides to generate the acid catalyst in situ in a range of 0.01–10%. It is theorized that this produces hydrochloric acid which will drive the reaction consistent with the limitations set forth hereinabove. In the method shown in FIG. 10, the wood may be exposed to a solution tetrahydrofuran (90%) having 1.0% percent borax as an insect repellant and 9.0% methyltrichlorosilane ($Cl_3SiCH_3$ or MeCl3Si). As shown in FIG. 10, the MeCl3Si and boron has hydrolyzed to produce $MSi(OH)_3$ and $B(OH)_3$ as well as hydrophillic acid as catalyst.

As shown in FIG. 13, this solution may be enclosed with the wood. Heat from the reaction will add pressure which will increase the saturation. The release of pressure and heat will indicate a completed reaction.

Alternatively, the reaction time and pressure may be controlled so that less of the interior of the wood is affected to provide a surface treatment so that boron or other additives will be less completely trapped within the wood product.

A modified process of spraying or brushing may be utilized . This would be useful on existing structures or living trees. It will also be useful whenever immersion is not possible.

Specific embodiments taught herein use boron or other metallic or metalloid atoms such as boron, aluminum or metals such as copper, or compounds such as aluminum acetate containing those atoms that, in conjunction with a carrier, and preferably a reactive silicate of the type described herein provide additional protection within the artificially fossilized wooden products.

Borax is an example of a boron salt which may be used in conjunction with the process. In order to incorporate Boron, Borax or Boron Anhydride may be used. In addition Boric Acid or trimethyl borate, a boron halide such as boron triflouride or boron trichloride with a salt can be used for different effects.

The steps in processing the wood would be to prepare the solution, put the wood in solution and optionally allow the combination of the wood and solution to be sealed so that the heat and pressure generated by the reaction, for example, between the methyl trichlorosilane could build. In the sealed embodiment, when the pressure drops, indicating that the heat generated by the reaction is ended or after a set period time if the wood is not to be fully treated, then the wood would be taken out of the solution.

An alternative step in this inventive process is to treat composite wood which has glues which favorably interact or react with silicon (or other solute compounds) in order to strengthen the bonding within the glue. It is noted that certain solvents will not affect certain glues and a proper combination of glue and solvent and silicate (reactant or donor) is necessary.

This can be found in what is commonly known as press board which utilizes a combining glue. The wood, even in these compressed and glued products, is treatable. The silicon or other atoms in the solute compound may participate to strengthen the bonds in the glue where a proper combination is utilized.

This treatment can be accomplished with other components of wood such as lignin, carbohydrates and polysaccharides in order to accomplish similar results. Cellulose is preferred since it is such a prevalent part of the cell structure. Also, it can provide a template for alignment of the shield.

Other techniques, disclosed in the specification incorporate the use of ultrasound in order to increase the ability of the wood to carry the reactive compound of the type described herein or even when using a traditional treatment mechanism (FIG. 13).

Silicon donors include methyltrichlorosilane, triethoxyoctylsilane, octeotrimethylsilane, chlorotrimethylsilane and phenyl trichlorosilane.

The basic chemical process includes reacting the silicon and/or boron donors (or their equivalents) with water molecules from water in the wood. In the case of boron, that would yield boric acid plus water plus $H_2B_4O_7$ using of trimethyl borate or a different alkyl borate. (FIGS. 7 and 8)

These would each react with one of the OH or hydroxyl groups of the cellulose in the presence of a strong acid derived from the pr-catalyst included in the formula.

The silicon would bond at the same location as the hydroxyl group. If boron and silicon are used together, a certain proportion of the hydroxyl groups would be replaced with the boron compound and a certain number will bond with a silicon compound and in some cases there could be an exchange.

The basic structure of the molecules used in the process described herein include:

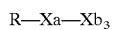

or

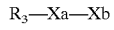

or

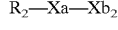

or

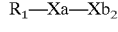

or $$R_2\text{—}Xa\text{—}Xb_1$$

or $$R_4\text{—}Xb$$

or $$R_3\text{—}Xb$$

R is a straight chain or branched chain alkyl group, aryl or benzyl group, Xa is a trivalent, tetravalent or pentavalent atom and Xb is a halogen (halogens including fluorine, chlorine, bromine, etc.) atom having valence electron and which may react or their equivalent.

Silicon procatalyst donors might be shown with the general formula R—Si($X_3$) This silicon donor can be represented by the general formula where $Xb_3$ is a halogen such as chlorine, bromine, iodine.

Instead of halogens, Xb could be an alkoxy group (such as methoxy, ethoxy, propoxy, butoxy or an alkoxy group with the number of carbon ranging from 3 to 20 in a straight chain or a branched chain configuration. Larger chains cause interference problems with the reactions). The $Xb_3$ may also be a phenoxy group, a benzyloxy group or an aryloxy group in which the aromatic ring is replaced with a polycyclic aromatic ring. These would not produce acids Silicon could be replaced with a group 4 atom such as Ge, Tin or lead. Lead, for example, may be useful in the construction of nuclear plants.

The mixture of the boron and silicon donors with solvents will determine the type and extent of bonding.

While boron and silicon are used to this example, titanium would work and so would many trivalent, tetravalent, or pentavalent atoms. In other words 3, 4 or 5 valence state atoms (i.e. atoms from groups 3, 4 or 5 of the periodic table) would work in the bonding process. Examples of substitutes for boron include Aluminum, Galium, Indium or thalium (Tl), by way of example.

Reagents: Boron and Silicon and related reagents include:
a) Boron oxide ($B2O_3$) like other metals having a 3, 4 or 5 valence outer shell could react with moisture and water within the wood or wood products to generate Boric Acid that could be entrapped within the polymer matrix or shield when used as a mixture with silicon donors or may react with acid or acid pro-catalysts as shown above.
b) Chlorotrimethylsilane could be pro-cataylst and reactant
c) phenyltrimethoxysilane could act as a silicone donor, but requires an acid (or base equivalent) to react.
d) Triphenylsilylchloride could act as a silicone donor, but requires an acid (or base equivalent) to react.
e) Propyltrichlorosilane could act as a silicone donor, but requires an acid (or base equivalent) to react.
f) Propyltriethoxysilane could act as a silicone donor, but requires an acid (or base equivalent) to react.
g) Hexamethyldisilanzane could act as a silicone donor, but requires an acid (or base equivalent) to react.
h) Titanium tetrabutoxide [TBT] is an example of a tetravalent metal in place of silicon. Other atoms could be used.
i) Triethylorthosilicate could act as a silicone donor.
j) OCTEO-S [n-octyltriethoxysilane, TECH] is a silicone donor.
k) Octyltriethoxysilane could also act as a silicon donor.
l) Trimethylborate [TMB]. Reacts with water/mixture within wood to undergo partial or full hydrolysis to polyborates or boric acid respectively. (See FIGS. 8, 9 and 10). It could react after partial hydrolysis with methyltrihydroxysilane to form mixed boron and silicon polymers as shown. It can directly react with cellulose in the presence of acid catalyst generated from pro-catalyst to permanently from an oxygen-boron covalent bond.
m) Tri-ethylborate is a reactive alternative which shows the use of an ethyl group in place of a methyl group to produce a similar result with a larger carbon chain. Large carbon chains or ring compounds may also be used as long as the carbon groups are not so large as to interfere with the reaction.
n) Boron halides generally are workable, such as borontrichloride, borontribromide and borontrifluoride. These are highly reactive compounds which directly react with the hydroxyl groups of wood cellulose or other compounds of wood to form respective borates with the elimination of acid halides.
o) A 0.5 percent solution if boric acid in acetone with an appropriate amount of TMB can be used for a more stable formulation with a silicon donor such as MTS (Methyltrichlorosilane).
p) Methyltrichlorosilane [MTS] is another procatalyst. This reagent in THF as a carrier is one of the initial formulations.

FIG. 7 shows the hydrolysis of MTS to methyltrihydroxysilane within the wood (postulated) and its subsequent conversion to a polysiloxane that reacts with the hydroxyl groups of wood cellulose forming the polymer matrix or shield.

If, in a reaction, hydrochloric acid is released, the acid would preferably be diluted, degraded (neutralized), or otherwise removed during or after the treatment process to prevent the degradation of the wood or irritation caused by the slow release of this acid to the environment. It could, for example, be converted to environmentally safe substances. Salts may be produced.

This reaction may be shown as:

R—Si—$X_3$ (here ($CH_3$)—Si—$Cl_3$) in a solvent to yield— R—Si—$(OH)_3$ (Step A) which would subsequently react with cellulose (Step B) to form the modified cellulose chain as shown in FIG. 6 (Step C) plus water.

Diatimatious earth, sodium silicates, or other boron or silicon salts may be used as a source of donor atoms. These may be mixed to provide intermediaries in solution which would, working together, achieve the desired end product in the wood. Examples of products having these qualities include boric acid, trimethyl (trialkyl) borate, Boron Halides ($BF_3$, $BCl_3$, for example), and Boric Anhydride (boron oxide).

Solvent: The solvent can vary tremendously also although it is preferably a non-water based solvent so as not to cause a reaction or an organic solvent with a minimal water component. It would typically be structured so as not to effect the glue or other properties of wood composites when treating wood composites. THF (Tetrahydrofuron), alcohols, or acetone are exemplary solvents.

(Acetone) is also a good carrier for non-glue wood composites.

(THF (Tetrahydrofuran)) works well with glues used in wood.

Polydimethylsiloxane may be used as an additive especially with boron compounds to increase the silicone content.

Alcohols, such as methanol or ethanol work well.

Water is also a solvent present in some cases given its trace presence in many solvents. Water may be used with this formulation as an alternative to part of the organic solvents in certain formulations. Water is not the most preferred compound because it would compete with water in the wood unless a slower reaction was desired.

The various silicon-boron combinations, with or without the additives, will work on all wood, treated wood and wood products, with varying efficiencies and results. Individual variations in results may occur based upon the nature of the solvents used to prepare the formula and with the kind of sample of the wood to be treated.

Solvents and chemicals are selected for compatibility with the type of material or wood being treated. For example, the acetone pro-catalyst, non-catalyst reactant formula may be optimal for soft wood, whereas the acetonitrile solvent formula may work better for hard wood.

Likewise the non-acetone based formula may be the preferred embodiment for treatment of Particle Board, OSB or Chip Board where the glue is dissolved by acetone. The alcohol based formula may be better for southern pine.

In some cases the solvent and additive may be reacted to form a gel and in other cases it might be useful to agitate the solution in order to prevent gel formation.

The proportion of chemicals results in different finishes and features and the solvents can also contribute to the variety of product out-comes.

Other solvents include any water compatible organic solvents, such as dioxane. One of the key elements of the solvents in most applications would be that it would have a boiling point under a 100 degrees Centigrade.

It is believed that borax, sodium silicate and other additives can be trapped inside the polymer shield formed by the reaction.

The current Applicant's invention formula incorporating the carbon-silicon-halogen reagent, a boron donor, borax, sodium silicate, metal or metalloid catalysts or enhancers with THF or it's equivalents as the solvent.

The applicant's invention allows for different stabilizers and enhancers.

One example is the use of chemical additives as enhances to retard fires such as phosphorous compounds.

Catalysts [Acids and products yielding acids in solution] can be used to enhance the process as shown and described above in reference to FIGS. 15 and 16. Indeed, this type reactant is necessary to drive the reaction in the preferred embodiment.

Another method of enhancing the process is to provide that it be done in an enclosure to allow the chemical reaction to build pressure. Pressure may be induced by external factors to the chemical reaction such as the use of ultrasound to speed up the process by aligning the molecules within the wood (whether cellulose, lignin or other molecules alone or in groups).

Other pre-treatment steps include the infusion of moisture in the wood before or during treatment, the use of wood closer to the production stage (i.e. greener wood), or putting other solvents or additives with the water within the wood prior to treatment with the reactant chemicals in order to provide carrier or additives chemicals within the wood to enhance the treatment. Water might be mixed with wood composites in order to help the process along.

Donors (of boron or silicon for example) may be infused within the wood or composite prior to the addition of the solvent or acid on silicate catalyst. This would be particularly simplified where wood composites (fiberboard for example) were being manufactured prior to being treated in the process steps.

The R group in the above silicon (or other trivalent, pentavalent or tetravalent atom) donor is an alkyl group ranging in a carbon chain length of 1–20 units in a straight chain or branched chain configuration. All these reagents are capable of undergoing the similar transformation as depicted in FIG. 7, FIG. 14 or FIG. 15. The non-halogen substituted silicon reagents (alkoxy and hydroxy) in this general formula react only slowly and the completion of the reaction would require a longer time, under ordinary conditions. However this process could be enhanced by the inclusion of acid or base catalysts to the silicon reagents, as shown in FIGS. 14 and 15. These catalysts may include, but are not limited to, a metal alkoxide or an acid such as metaphosphoric acid.

In the above general formula Silicon (Si) can be substituted, for example, with Titanium (Ti) and all other factors may remain the same. A typical example would be Tetramethyltitanate. A general representation of the formula would be $Ti[R]_4$ where R=a halogen, an alkoxy group, a phenoxy group or a benzyloxy group as, defined above for the silicon donor.

Hydrophobic Reagents include gasoline and toluene.

The following silicon reagents can also react with the hydroxyl groups of wood components to render wood hydrophobic, insect and fire resistant:

(1) Dichlorodimethylsilane represented by the general formula: $[R]_2Si(X)_2$; where R is an alkyl group ranging in carbon chain length of 1–20 units as a straight chain or as a branched chain, or a phenyl group or a benzyl group and X=a halogen, an alkoxy, aryloxy or benzyloxy as defined above. Another common example is dichlorodiphenylsilane.

(2) Chlorotrimethylsilane represented by the general formula $[R]_3Si—X$, where R is an alkyl group ranging in carbon chain length of 1–20 units as a straight chain or a branched chain and X which is a halogen an alkoxy, aryloxy or benzyloy as designed above. Another common example is Chlorotriphenylsilane.

(3) Hexamethydisilazane: This compound will form a trimethylsilyl derivative of the hydroxyl groups of the components of wood or wood products with the evolution of nitrogen in combination with an appropriate catalyst. The catalyst may be phosphoric acid that by itself may render the wood fire resistant.

(4) Octyltriethoxysilane [OTS]. This is an excellent reagent that would function in a neutral environment. The reagent is cost-effective and environmentally clean. Possible improvements to speed up the reaction with the addition of catalysts [metaphoshoric acid for example] could also render fire proofing. Another common example is propyltriethoxysilane.

Phosphorous Reagents

Phosphorous reagents can also be used to modify the hydroxyl groups of wood components to make the wood fire and insect resistant. Common reagents that can be used for this purpose are:

(1) Triethylphosphate: Here phosphorous is in the pentavalent state and the trimethoxy groups are prone to hydrolysis by moisture/water within the wood and generate phosphoric acid or polyphosphoric acid which is a fire retardant. The hydroxyl groups of the cellulose or other wood components may directly react with triethylphosphate displacing one or more of the methoxy groups with the formation of a chemical bond between the phosphorous and the oxygen atoms of one or more of the hydroxyl groups. Another common example is trimethylphosphate.

(2) Triethylphosphite: Here phosphorous is in the trivalent state as in trimethylborate [TMB] and the mechanism of reaction with wood or wood components are identical to those of TMB as described above. As is the case with TMB there are two possibilities. Triethylphosphite can react with moisture (water) in the wood or wood components to produce phosphorous acid or polyphosphorous acid within the wood to make it fire and insect resistant. When used in combination with a silicon reagent this combination would trap the phosphorous acid trapped. Alternately triethylphosphite can react with one or more hydroxyl groups of wood cellulose or other components of wood to form permanent chemical bonds to render wood fire and insect resistant. Other common reagents are trimethylphosphite or triphenylphosphite.

Copper compounds may be used in place of or in conjunction with silicon and boron within the process embodied herein. No chemical process necessarily results in a single outcome. FIG. 6-B shows an approximation of the most likely end structure for cellulose without a complete replacement of hydroxyl atoms in the chain when treated with a mixture of silicon and boron under the process steps taught hereunder.

FIG. 6A shows an alternative structural outcome.

FIG. 8 shows the reaction postulated for a boron donor. The corrugated double line 1 represents the cellulose polymer while the cellulose OH groups are non-remarkable, hydroxyl groups coming off from individual cellulose molecules within the polymer as a result of the reaction.

FIG. 8 shows where $B(OCH_3)_3(A)$ is converted to an intermediary $B(OH)_3(B)$ which then reacts with the hydroxyl groups (C) to yield a polymer of Boron and Cellulose polymer in the presence of a strong acid.

FIGS. 8 B1 and B2 show alternative intermediary boron molecules which may be utilized in this process.

As can be seen by reference to FIG. 13, the process of treating wood may be described as introducing a wood product (3) into a chamber (12) which opens at entry (9). The entry (9) is then closed and if desired an electromagnetic field is introduced to expedite the reaction using field generators (11) which may be magnets or ultrasound generators to obtain desired atomic alignment to enhance or restrict the reaction. In the preferred embodiment ultrasound is used to align and open the partial passages of the wood to enhance penetration.

This field may be maintained by the process or it may be begun and stopped repeatedly or terminated after a certain time to get the desired penetration or to limit the treatment area to the surface of the wood by closing the natural wood passages. At this time, or before, one or more reactants may be introduced into the chamber (12). Thereafter the entry (9) is closed unit other reactants are added or removed. The reactants maybe introduced or removed through a chemical opening (4) in the container which may be sealed by a valve (7). The valve may include a temperature or pressure monitor to determine when the reaction is complete or when it has reached a certain level. The chamber may be vented.

At any point the reagents may be drained through a valve in a drain (5) and other chemicals, such as an acid neutralizing agent, may be added to wash or treat the wood.

Thereafter the wood my be removed from the entry (9) or an appropriate exit (10) so that one piece of wood may be used to push the other one out in a continuous process.

FIG. 14 show how particles of wood (13) may be turned into particle board utilizing the process through the steps of [1] combining the particles (13) with a glue (14) and, optionally, [2] one of the reagents (15) (such as borax) in a chamber (18) in the bottom (19) of a press. [3] Before, after and during the compression process when the top (17) of the chamber presses on the mixture of glue, wood and reagent, [4] a solvent (16) which may include all or one of the reactant solutes may be introduced through a passage (20) in the chamber to initiate the reaction. A pressure release valve (21) may be used to allow gases and pressure to escape this process.

The process of locking in entrapping, or reacting beneficial atoms or molecules within the wood structure comprises the steps of:

(1) Selecting an additive which may enhance a desired property from the group of properties comprising:

(a) Fire resistant, (b) Insect resistant, (c) Moisture resistant, (d) Modified by color or stain (such as by iodine which may also be used in radioactive form for determining penetration), (e) having better glue attachment qualities (silicon typically reinforces the formaldehyde and resin type glues used for wood), (f) having better insulation qualities (sulfates, such as carbon di-sulfate workwell), and (g) to change the chemical structure of cellulose or some other chemical within the wood to change specific characteristics to the wood (2) Adding the additive to the wood by:

(a) mixing particles of wood with the additives and forming a wood composite;

(b) dissolving the additive and flowing the additive into the wood or;

(c) pressing the additive with the wood in a gas or solid phase; and (d) reformulating the wood cellulose polymer to create a partial or full barrier to leaching.

An optional step may be to enhance absorption of the additive or reformulating chemicals using (i) alignment and/or opening of wood pores using ultrasound, electromagnetic fields, heat, heat with steam and the like.

Because wood cellulose defines a specific matrix or structure (as shown in FIG. 1), oligomers would have a difficult time forming aligned intermediaries such as those shown in FIG. 8c or 10b where the reactant atoms (here silicon and boron) are aligned to covalently bond together and to the wood cellulose to form the desired shielding.

In order to avoid the creation of oligomers which would prevent alignment and the desired reaction within the wood, the amount of non-hydrophilic (including hydrophobic) solvents and water, must be limited to still have reaction work. Also, the non-catalytic reagent ratio to catalytic reagent must be controlled to prevent damage to the wood.

Therefore, to carry out a reaction which is commercially viable, the preferred ranges for reactants and non-reactants in the solution applied to wood where a catalyst or pro-catalyst (an acid or an acid producing molecule) is used to drive the reaction could be expressed in the ratios or percentages as set forth below.

(1) The range of acid or procatalyst is in the range of about 0.1–10%. Practically speaking, to protect the wood, this would be from about 0.1 to 4.9%. For purposes of these limitations, the only acids which would work efficiently would be those with a pKa of about 2.5 or less. This would include acids like Hydrochloric and Phosphoric acid as shown in the examples. Pro-catalysts would be those chemicals yielding an acid when exposed to the moisture in the wood or when exposed to the wood hydroxyl groups. Tri-chlorosilane is an example. A lower concentration as low as 0.01% would work slowly; but, since it acts as a catalyst, would still work.

(2) The range of non-catalytic reagent (NCR) would be in the range of 0–65%. Non-catalytic reagent would be reagent which would not react unless in the presence of a pro-catalyst or appropriate acid. Examples of non-catalytic reagents would include hydroxyl and alkoxy bonded to trivalent, pentavalent and tetravalent atoms without halogens bonded to alkyl or aryl groups. The concentration of NCR to pro-catalyst is used to control the cost, acidity and efficiency if the reaction.

From a comparison of the above referenced percentages, it can be seen that the range of acid or pro-catalyst to non-catalytic reagent would be preferably in the range of 1:6 or less (one molecule of pro-catalyst for every molecule of non-catalytic reagent). Preferably the catalyst would be in the range of 5% or less of the non-catalytic reagent. For example, if the catalytic reagent was 50% of the total solution, then the pro-catalyst would preferably be less than 2.5% of the total solution.

(3) The amount of water added to the solution would slow down or degrade the reaction. In order to control this, the practical range would be from 0–0.5%. Using agitation to prevent the formation of oligomers and non-reactive components would allow water concentrations as high as 8.0%. Another useful limitation would be to maintain the water concentration 2.0% below the concentration of the pro-catalyst and NCR.

(4) Similar to water, the concentration on non-hydrophilic organic solvents or even non-organic solvents (such as water) may occur in similar ratios to the solution. Operational ranges for non-hydrophilic organic solvents could range from 0–20%, although a 10% or less range would be more practical.

The use of hydrophilic organic solvents is critical to maintaining reactivity in most situations where this reaction could be run and while a concentration as low as 10% might yield a reaction which could work, a more practical range would be in the range of 99.9%–30% of the total solution. If a competing reaction was present, such as is present where water is used, the solution would have to be 50% more hydrophilic organic solvent then water concentration to remain commercially viable.

Except where used to slow the reaction, the non-hydrophilic organic solvents or non-organic solvents (such as water) would essentially be impurities adding nothing to the beneficial aspects of the reaction except where they could enhance the processes described herein.

5) Since some oligomerization may occur and still allow the reaction to go forward, it is important to view the invention as one wherein there is a solute compound having a functional group which includes (i) an atom selected from the group consisting of trivalent, tetravalent and pentavalent atoms, wherein said atom is bonded to (A) a halogen atom or (B) a functional group selected from the group consisting of a hydroxyl group, alkoxy group, phenoxy group, benzyloxy group and an aryloxy group having a polycyclic aromatic ring, in the form of a monomer or unstable (transient) oligomer. Since trace amounts of oligomer may occur, the invention can be safely described where the monomer, as a percent of total solution, is over 5%. To be practical, the monomer should be at least 10% of the total solution. This monomer is the reactive component of the solution.

The instant patent technology differs entirely from the prior art technology with respect to the composition in several particulars.

1. Chemical composition of the treatment formula is chemically well defined and identified.

2. The composition does not make use of aqueous solutions. An anhydrous organic solvent is required for the composition.

3. The composition must have a halogenated silane component as a pro-catalyst or a comparable substitute while acids with a Pka of 2.5 or less will work. The effective use of pro-catalyst allows the reaction through the production of acid in the wood. Mixing the acid into the solution prior to putting the chemical into the wood can work, but it is preferably done using lower concentrations with pro-catalysts.

4. The formula or the solute compound is sufficiently small and organized so that it enters wood without prior conditioning and aligns with the wood cellulose without the need for excess energy to disrupt the composition of the solute compound in the wood or during treatment. Wood need only be dipped, brushed or sprayed with the formula to accomplish the desired result.

5. The composition instantly reacts with wood hydroxyl groups on contact and activates the accompanying reagents to form silicon-oxygen covalent bonds not only on the surface but also within the wood, probably forming 7–12 member cyclic silane rings (FIG. 17).

6. Applicant's inventive composition requires no prior drying of wood or no drying of wood after treatment and no curing of wood to be effective.

7. The instant formula are unique with respect to defined and pure ingredients. The formula may employ a halogenated silane (or other pro-catalyst generating the appropriate acid within the wood) or it's equivalent and a non-aqueous organic solvent to be effective.

8. The present formulation also has definite and commercially significant advantages with respect to the use of pure and well defined compositions. The reactants penetrate wood without mechanical assistance (such as application of vacuum, or heat pressure). Stable silicon and boron bonds to wood that are not leached out are formed in a simple treatment. Non-water based formulations are used. Water is not recommended in the compositions and a non-aqueous organic carrier is used. A halogenated silicon [eg. Methyltrichlorosilane] is used as the reactive reagent (pro-catalyst). The reaction of methyltrichlorosilane to wood hydroxyl groups forms spontaneous permanent bonds wood. It must be noted that only after this initial spontaneous reaction of MTS with water and wood cellulose and the generation of HCl, are the remaining reagents in the formula activated for reaction with wood hydroxyl groups. A spontaneous reaction with wood hydroxyl groups and release of reactive agents (HCl) within the wood activates the non-pro-catalyst reactants to further react with wood cellulose to create new silicon (boron) bonding to wood.

The present invention avoids the need for energy application by applying reactive solutes to the wood itself and creating any polymers or any oligomers in the wood as part of an exothermic reaction generating the energy with which to carry the reaction to the point of creating a polymer out of the cellulose.

The present invention includes the use of un-oxygenated silane chemicals which are applied to the wood and, utilizing a catalyst in the form of acid or a reacted solute such as a halogenated compound such as methyltrichlorosilane that in the wood cellulose matrix are reacted in order to get the intermediary oxygenated silane which then immediately react with the hydroxyl groups in the cellulose in order to polymerize the oxygen and silicon atoms in order to form chains directly on the wood cellulose catalyzed by the acid formed by water in the wood and the halogen. The dramatic and non-obvious result is that instead of having to utilize energy in order to generate the reaction, the reaction itself is self-propagating and will generate heat and pressure until the entire wood is treated or until the silane reagent is used up forming a protective barrier on every side of the wood cellulose chains.

An added benefit is, instead of requiring that the oxygenated solute be pushed into the wood under pressure leading to imperfect saturation and high cost, the reaction pulls in the unoxygenated silane as fuel for the chemical reaction so that penetration may be obtained at a much deeper level.

One reason for using organic solvents is in order to prevent the oxygenation of the silane until they come in contact with the water within the wood. One limitation would be to have at least 50% unoxygenated silane to prevent waste.

Methyltrichlorosilane is not the predominant reagent in the most effective embodiments, but is an activator used in catalytic amounts to initiate the reaction of a nonactivators such as methyltrimethoxysilane which is the primary reagent that forms the vast majority of covalent linkage to wood molecules having hydroxyl groups [cellulose, lignin etc].

The solvents, in the preferred embodiment, are non-reactive hydrophilic solvents to allow penetration of reactive reagents [a mixture of methyltrichlorosilane and trimethyl borate, for example] and non-reactive alkoxy silanes to deep within or interior of both wet and dry wood.

Figures 17A, 17B:
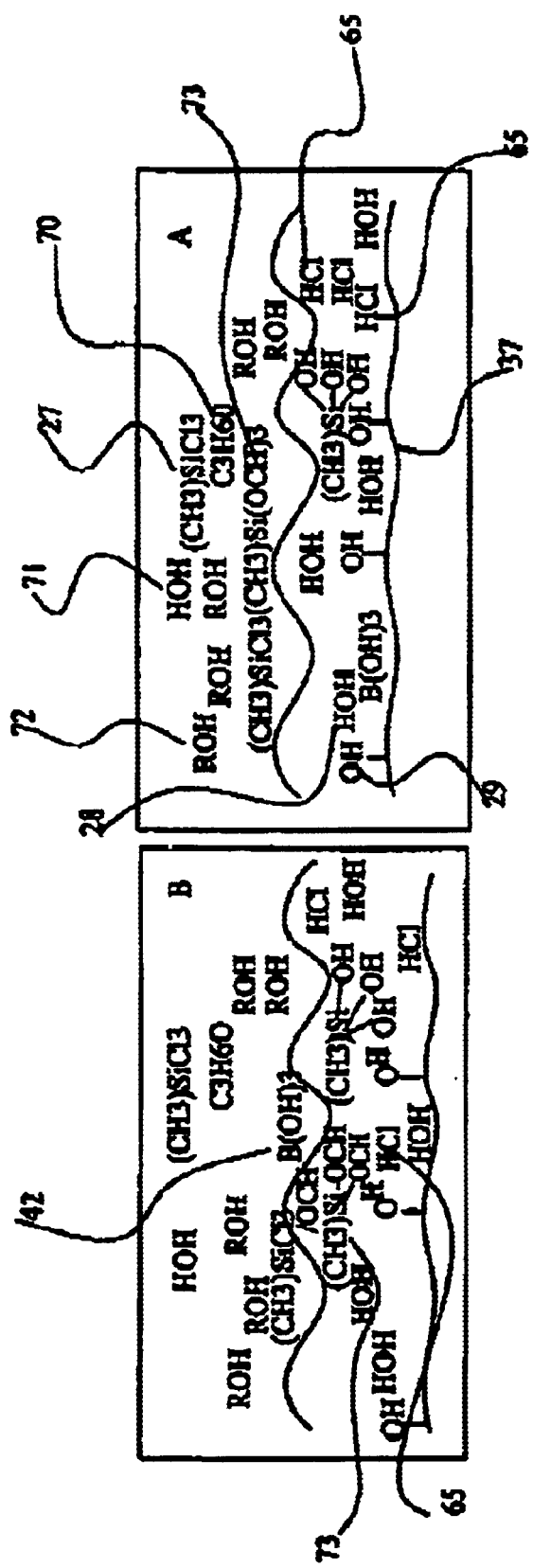
Figure 17C:
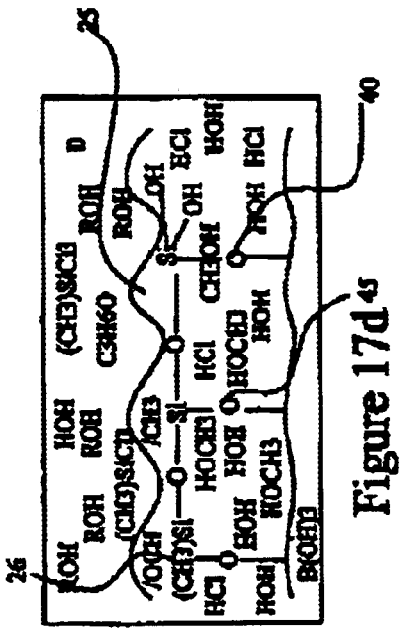

A plurality of Applicant's reactive molecules may enter to the wood cellulose from a solution as shown in FIG. 17A. Here the solution is an alcohol 72 solvated solution, although there may be trace amounts of water 71 and other organic solvents 70. A pro-catalyst 27 (MeSiCl3 here) and a silicone donor 73 (MeSi(OCH3)3 here) are used to prevent the pro-catalyst 27 from adding too much acidity to the wood. The use of hydrophillic organic solvents and monomers allows the reaction to begin and proceed by simple diffusion of the solvents and reactants into the wood.

One of the pro-catalyst monomers 30 has reacted with water in the wood to form the catalytic acid 65 (HCl) as also shown in FIG. 7.

FIG. 17b shows where the acid 65 is catalysing the reaction with a non-pro-catalyst silicone donor 73.

Figure 17D:
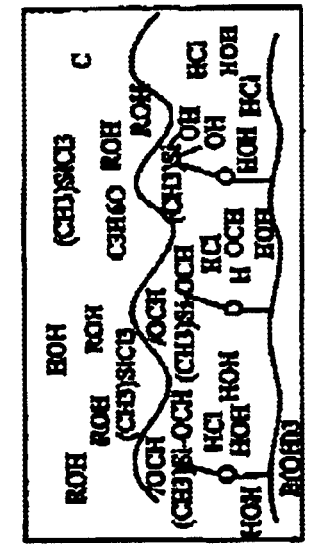
Figure 17E:
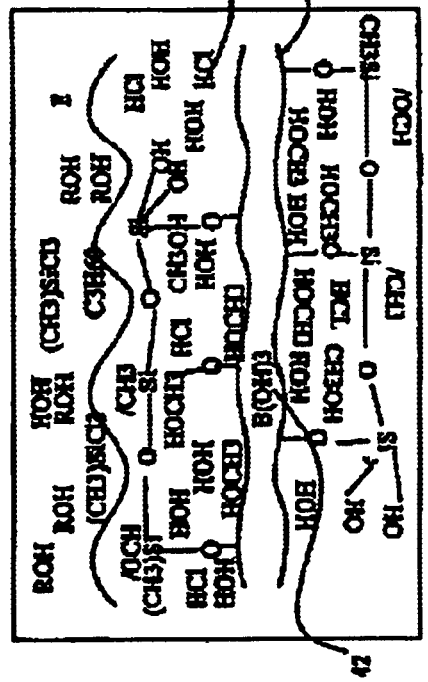

Next, this process continues so that a plurality of reactive molecules ares chemically linked to at least one second reactive molecule so as to form a matrix of cross linked reactive molecules one reactive molecule linked to the wood as shown in FIG. 18C and also linked to at least one other reactive molecule linked to the wood FIG. 17d to form a cross linking of reactive molecules and wood FIG. 17d. Within or between these modified cellulose chains, borates 42 and other additives may be trapped as shown in FIG. 17e.

The result is a plurality of reactive molecules having a link to the wood cellulose and wherein at least one first reactive molecule is chemically linked to at least one second reactive molecule so as to cross-link the plurality of reactive molecules to the wood cellulose through one or more of the hydroxyl groups on the wood cellulose. The compounds are covalently bonded through reaction with one or more hydroxyl groups of the wood cellulose.

At least one first reactive molecule is chemically linked to at least one second reactive molecule so as to cross-link the plurality of reactive molecules to the wood cellulose through one or more of the hydroxyl groups on the wood cellulose.

The solution contains a hydrophilic organic solvent and a plurality of molecules having at least one first molecule and at least one second molecule selected from R-Xa-Xb$_3$, R$_3$-Xa-Xb, R2 Xa Xb$_2$, R2 Xa Xb, R4Xa, R3Xa or R Xa Xb$_2$, wherein R is an alkyl group, Xa is a trivalent, tetravalent or pentavalent atom, and Xb is a halogen, hydroxyl group, an alkoxy group, a phenoxy group, a benzyloxy group or an aryloxy group with a polycyclic aromatic ring. The process involves applying the solution to wood cellulose and exothermically reacting said plurality of molecules with the wood cellulose so the first molecule is covalently bonded to the wood cellulose, and repeating the steps over the matrix defined by the cellulose matrix to have a polymer shield of repeating rings (FIG. 17D).

The process for the polymerization of wood cellulose, has the steps of:

(a) providing a solution containing a hydrophilic organic solvent and a compound containing a trivalent, tetravalent or pentavalent atom and a halogen atom, hydroxyl group, alkoxy group, phnoxy group, benzyloxy group or an aryloxy group having polycyclic aromatic ring (a polymer of a plurality of atoms containing a trivalent, tetravalent or pentavalent atom and a halogen atom, hydroxyl group, alkoxy group, phnoxy group, benzyloxy group or an aryloxy group having polycyclic aromatic ring might work poorly if it was disrupted (essentially rendering it into the compounds previously set out) before being introduced in the wood or afterwards because of the need to align molecules);

(b) applying said solution to wood cellulose in the presence of a catalytic compound as defined herein and, (c) exothermically reacting said compound with the wood cellulose so that the compound is covalently bonded to the wood cellulose.

Figure 9:
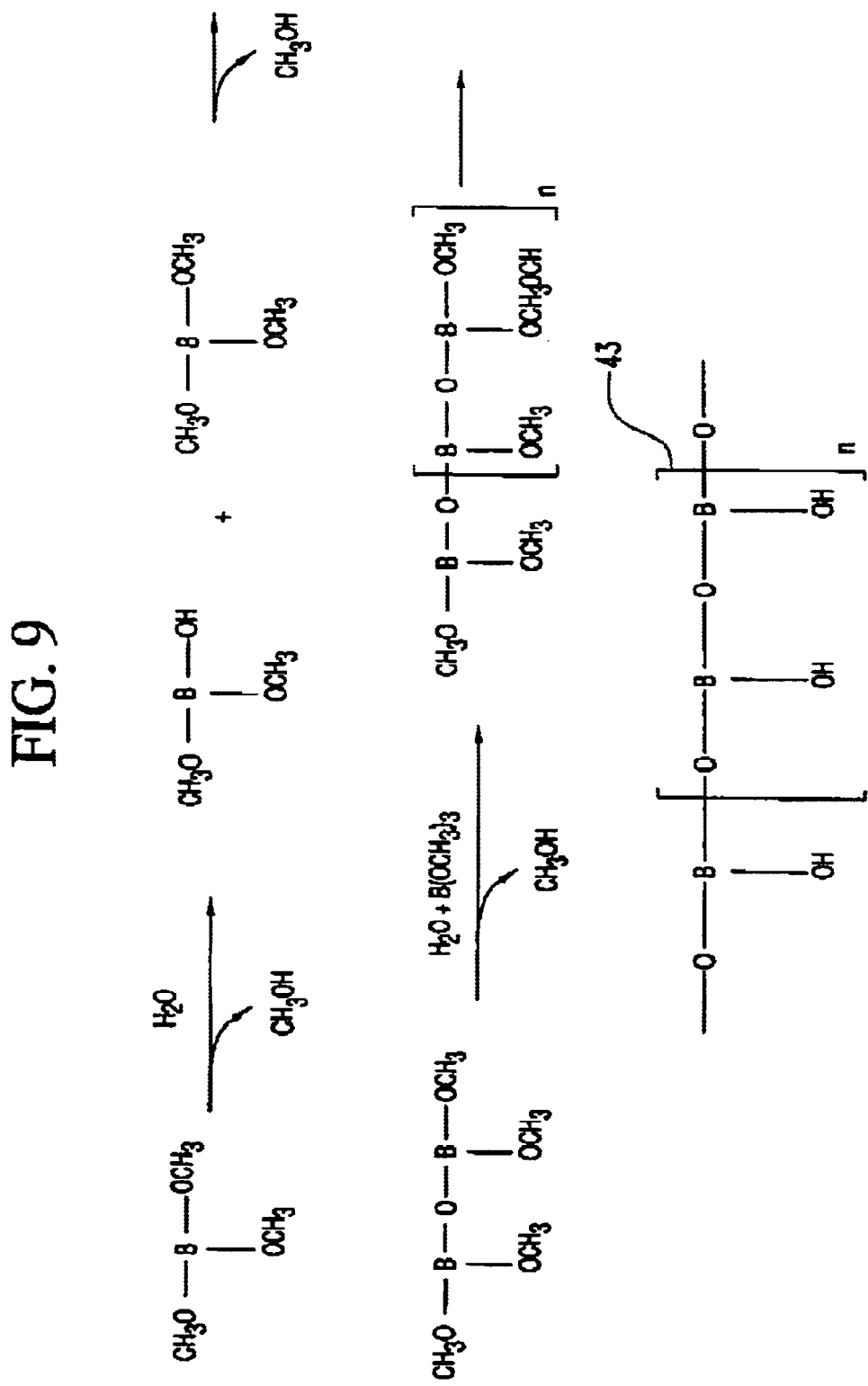
FIG. 9 shows an alternative mechanism for achieving an alternative to intermediary 8b.

Boron Oxide, reacts with moisture/water within the wood or wood products to generate Boric Acid that could be entrapped with the silicon shield. However, in the proportions stated, trimethylborate [TMB] reacts with water/moisture within wood to undergo partial or full hydrolysis to polyborates or boric acid respectively (FIGS. 8 & 9). It could after partial hydrolysis react with methyltrihydroxysilane to form mixed boron-silicon polymers [FIG. 10] and with the proper catalysts triethylborate and other alkylborates could be incorporated into wood in this manner.

A 0.5% solution of boric acid in acetone with an appropriate amount of TMB can be used for a more stable formulation with a silicon donor such as MTS.

Boron Halides, borontrichloride, borontribromide and borontrifluoride are examples of highly reactive compounds which will directly react with the hydroxyl groups of wood cellulose or other compounds of wood to form respective borates with the elimination of acid halides and can act as procatalysts which do not react directly.

FIG. 7 shows the hydrolysis of MTS to methyltrihydroxysilane within the wood and its subsequent conversion to a polysiloxane that reacts with the hydroxyl groups of wood cellulose forming the polymer shield in the presence of the catalyst created in the wood (HCl) who MTS is used.

The main concern with the use of this reagent is the inevitable hydrochloric acid release. This problem can be addressed in various ways, one being to exposure of the treated wood to neutralizing solutions. The other method taught herein would minimize the ratio of procatalyst to non-reactive alkyl hydroxy trivalent, pentavalent or tetravalent atom.

Silicon donors in one embodiment have the general formula R-Si(X)$_3$. This silicon donor can be represented by the general formula R—Si(X)$_3$; where X is a halogen such as chlorine, bromine, iodine or an alkoxy group (selected from methoxy, ethoxy, propoxy, butoxy or an alkoxy group with the number of carbon ranging from 3–20 in a straight chain or a branched chain configuration); or a phenoxy group, a benzyloxy group or a benzyloxy group in which the benzene ring is replaced with a polycyclic aromatic ring. In the preferred embodiment X is part procatalyst (halogens) and part non-catalysts (alkoxyls).

The R group in the above silicon donor is an alkyl group ranging in a carbon chain length of 1–20 units in a straight chain or branched chain configuration. All these reagents are capable of undergoing the similar transformation as depicted in FIG. 7. While halogen substituted reagents are very reactive and the reaction could be completed within a few hours. The non-halogen substituted silicon reagents with this general formula react only slowly (if at all) without a procatalyst and the completion of the reaction would require days under ordinary conditions. However this process is enhanced by the inclusion of acid or base catalysts to the silicon reagents. These catalysts include, but are not limited to, a metal alkoxide or an acid such as meta-phosphoric acid.

In the above general formula Silicon (Si) can be substituted with Titanium (Ti) or other tetravalent atoms and other factors remain the same. A typical example would be Tetramethyltitanate. A general representation of the formula would be Ti[R]$_4$ where R=a halogen, an alkoxy group, a phenoxy group or a benzyloxy group as defined above for the silicon donor.

The following silicon reagents can also react with the hydroxyl groups of wood components to render wood hydrophobic, insect and fire resistant:

(1) Dichlorodimethylsilane represented by the general formula: [R]$_2$Si(X)$_2$; where R is an alkyl group ranging in carbon chain length of 1–20 units as a straight chain or as a branched chain, or a phenyl group or a benzyl group and X is a halogen, an alkoxy, aryloxy or benzyloxy as defined above. Another common example is dichlorodiphenyl-silane.

(2) Chlorotrimethylsilane represented by the general formula [R]$_3$Si—X, where R is the same selected from the above and X is the same selected from the above. Another common example is Chlorotriphenylsilane.

(3) Hexamethydisilazane: This compound will form a trimethylsilyl derivative of the hydroxyl groups of the components of wood or wood products with the evolution of nitrogen in combination with an appropriate catalyst. The catalyst may be phosphoric acid that by itself may render the wood fire resistant.

(4) Octyltriethoxysilane [OTS]. Is an excellent reagent that would function in a neutral environment. The drawback its high boiling point [difficulty drying] and slow reaction (more than a week after treatment). A waiting period of at least one month might be required to complete the process. The reagent is cost-effective and environmentally clean. Possible improvements to speed up the reaction with the addition of catalysts [metaphosphoric acid or other acid catalyst] that could also provide fire proofing. Another common example is Propyltriethoxysilane.

Phosphorous reagents can also be used to derivative (modify) the hydroxyl groups of wood components to make the wood fire and insect resistant. Common reagents that can be used for this purpose are:

(1) Triethylphosphate: Here phosphorous is in the pentavalent state and the trimethoxy groups are prone to hydrolysis by moisture/water within the wood and generate phosphoric acid or polyphosphoric acid which is a fire retardant. The hydroxyl groups of the cellulose or other wood components may directly react with triethylphosphate displacing one or more of the methoxy groups with the formation of a chemical bond between the phosphorous and the oxygen atoms of one or more of the hydroxyl groups. Another common example is trimethylphosphate.

(2) Triethylphosphite: Here phosphorous is in the trivalent state as in trimethylborate [TMB] and the mechanism of reaction with wood or wood components are identical to those of TMB as described above. As is the case with TMB there are two possibilities. Triethylphosphite can react with moisture/water in the wood or wood components to produce phosphoric acid or polyphosphoric acid within the wood to make it fire and insect resistant which when used in combination with a silicone reagent would trap the phosphoric acid inside. Alternately triethylphosphite can react with one or more hydroxyl groups of wood cellulose or other components of wood to form permanent chemical bonds to render wood fire and insect resistant. Other common reagents are trimethylphosphite or triphenylphosphite. Specific formulations include:

1. A composition consisting of a mixture of a procatalyst preferably methyltrichlorosilane in the range from 0.25% to 4.0%; a silicon additive, preferably methyltrimethoxysilane in the range of about 1.5 to 40%, a boron additive, preferably trimethylborate, in an organic drying solvent, preferably ethyl alcohol, to treat all wood and wood products to render to wood and wood products simultaneous hydrophobicity, microbial resistance and fire retardency. Using a kow as a standard, the solvent's kow could be a kow less than zero. The preferred solvents generally have a kow of –0.15 or less. Less than 2.0 could work in limited circumstances. A kow over 10 would be impractical. This general relationship of kow would apply to all solvents. The $K_{ow}$, or Octonal Water partition coefficient, is simply a measure of the hydrophobicity (water repulsing) of an organic compound. The more hydrophobic a compound, the less soluable it is.

While Kow is a standard for differentiation purposes, different organic solvents can work with different Kow. Hence, the better range is a log ($K_{ow}$) less than 1.0 or even one less than zero. However, Kow alone does not define the reactants since water has a Kow of 1. Also mixtures of solvents may work, even those containing water, as long as the overall solvent allow for the function described herein, namely allowing the reactants to be drawn from the solution into the wood at a desired rate of speed and without oligomerization in the solvent.

2. A composition for treatment of all wood and wood products, as set forth above consisting of a mixture of a pro-catalyst in the range of 0.25 to 4% represented by the formula R-X (Y)$_3$ where R is selected from a group of straight or branch chain alkyl substituents ranging in carbon numbers from 2–18 (eg. Methyl, ethyl, propyl, isopropyl, butyl, isobutyl, tertiary butyl, pentyl, isopentyl etc.), and aryl substituents phenyl and benzyl; X is an atom selected from the group Si, Ge, Sn, PB, Tl, Zn and Y is selected from a group consisting of Chlorine, Bromine, Iodine and Flourine; and a silicon additive in the range of about 3.0 to 40%, represented by the formula R-X (Y)$_3$, where R and X represents the same groups as above for the silicon non-catalyst, but Y is selected from a group consisting of methoxy, ethoxy, propoxy, butoxy, t-butoxy, pentoxy, isopentoxy, hexyloxy, phenoxy and benzyloxy substituents in an organic drying solvent selected from a group consisting of methanol, ethanol, propanol, isopropanol, n-butanol, isobutanol, tertiary butanol, pentanol, isopentanol, benzyl alcohol, acetone, tetrahydrofuran, dioxane and acetonitile to render wood and wood products simultaneously hydrophobic, microbial resistant and fire retardant.

3. A composition for the treatment of all wood and wood products consisting of a mixture of a pro-catalyst according to claim 1, as it is defined above; a silicon additive as defined and trimethyborate [B(OMe)$_3$] in the range of about 0.25 to 35% in an organic drying solvent as defined, to render to the wood hydrophobic, and microbial resistance and fire retardant simultaneously.

4. A composition for the treatment of all wood and wood products, consisting of a mixture of reactive silicon reagent, a silicon additive and another reactive reagent in which trimethyborate is replaced with a compound having the general formula X(R)$_3$, where X is selected from a group of atoms consisting of B, Al, Ga, In, Tl, P, As, Sb, Bi and V and R is selected from a group consisting of F, Cl, Br, I, methoxy, ethoxy, propoxy, isoporpoxy, isobutoxy, pentoxy, isopentoxy, butoxy, tertiarybutoxy, phenoxy and benzyloxy substituents to render to wood and wood products hydrophobicity, microbial resistance and fire retardancy.

One embodiment of Applicant's invention is a solution as shown in Example 1:

EXAMPLE-1

Preparation of Reagents for Wood Treatments
Basic Silicon Formula (FRF-S): [Silicon]

In a 250 mL reagent bottle was added 137 mL of reagent alcohol was added followed by 60 mL of methyltrimethoxysilane (MTMS). After mixing the two agents by shaking; 3.0 mL of methyltrichlorosilane (MTS) was added from a pipette to this solution and kept ready for treatment. This clear colorless formula was found to be stable for the next several months with no appearance of any residue or cloudiness.

The drying agent is denatured alcohol available as a gasoline additive. This could be substituted with wood alcohol which is commercially available as an industrial solvent. The formula is made of 30% methyltrimethoxysilane (MTMS) and 1.5% methyltrichlorosilane (MTS).
Basic Boron-Silicon Formula (FRF-BS): [Boron, Silicon]

This formula is made of 30% methyltrimethoxysilane; 3% trimethyborate and 1.5% methyltrichlorosilane (MTS) in denatured alcohol. This boron and silicon containing treatment formula was prepared as above except, 131 mL of alcohol, 60.0 mL of MTMS, 6.0 mL of trimethylborate and 3.0 mL of MTS was used. The reagent was found to be stable without decomposition, residue formation or color change for the next several months of observation.
Modified Boron-Silicon Formula (FRF-MBS) [Modified Boron, Silicon]

This formula is made as a substitute for FRF-BS. The formula consists of 30% methyltrimethoxysilane (MTMS); 2% boric acid and 1.5% methyltrichlorosilane (MTS) in denatured alcohol. The formula consisted of 137 mL of denatured alcohol, 60 mL of MTMS, 3.0 mL of MTS and 4.0 grams of boric acid. On shaking this mixture for 10 minutes complete dissolution of the boric acid occurred and a crystal clear colorless solution was obtained which was also stable for the next several months of observation.

EXAMPLE-2

Treatment of Wood:

In a closed bell jar 200 mL of the appropriate reagents, (FRF-S; FRF-BS and FRF-MBS formula prepared as specified above) were poured and three wood pieces were placed inside such that about three fourth portions of the wood blocks were immersed in the reagents. 1×1" blocks of red oak and yellow pine as supplied (raw wood) were used for this study. The wood pieces were allowed to remain in this jar overnight during which time the reagents were drawn inside the wood. The temperature of the reagent solution increased by about 5 degree Centigrade during the initial exposure time of about 20 minutes by which time the penetration of the formula to the top surface of the wood was complete.

The wood pieces were allowed to air dry and periodically they were weighed to constant weight gain (about 48 hours). From this the incorporation of reagents to wood was calculated on a weight basis. The results are tabulated in the following table.

| Wood Sample | Wood Dimension | % Weight Gain | % Si | % B |
|---|---|---|---|---|
| Red Oak | 1 × 1" | 5.48 [FRF-S] | 5.48 | 0.0 |
| Red Oak | 1 × 1" | 5.85 [FRF-BS] | 5.32 | 0.53 |
| Red Oak | 1 × 1" | 3.13 [FRF-MBS] | 2.98 | 0.25 |
| Yellow Pine | 1 × 1" | 9.6 [FRF-S] | 9.60 | 0.0 |
| Yellow Pine | 1 × 1" | 9.1 [FRF-BS] | 8.19 | 0.91 |
| Yellow Pine | 1 × 1" | 8.68 [FRF-MBS] | 8.10 | 0.58 |

The above results show that red oak, a hard wood incorporates less reagents compared to soft wood (yellow pine) under identical treatment conditions. Although the desired levels of boron and silicon incorporation was achieved by this process, additional experimentation would be needed to see whether increasing the treatment time would increase reagent incorporations to the samples if desired.

The results are averages of three independent determinations.

EXAMPLE-3

Hydrophobicity:

Pieces of red oak and yellow pine treated as above in example-2 and untreated wood (red oak and yellow pine) blocks were selected at random and they were completely immersed in water (distilled water, immersions accomplished by placing a glass stopper over the wood piece such that the entire wood is completely immersed in water) for varying periods of time, and the weight of water absorbed as a function of time was determined for each treatment. These comparative results obtained under identical conditions are summarized in the accompanying graphs: [for red oak and yellow pine]. The results clearly illustrates that there are striking differences in the water absorption of treated wood with the untreated control. FIGS. 18A & 18B?

The results show that the apparent water absorption for red oak and yellow pine are similar although their silicon and boron contents differ significantly. Similarly FRF-S treated wood samples and FRF-BS treated wood samples exhibit similar hydrophobicity indicating that boron incorporation is not adversely affecting hydrophobicity of treated wood samples. These results indicate that boron is trapped in a silicate-cellulose matrix and water is precluded from coming in contact with boron due to the silicon shield.

Figure 18:
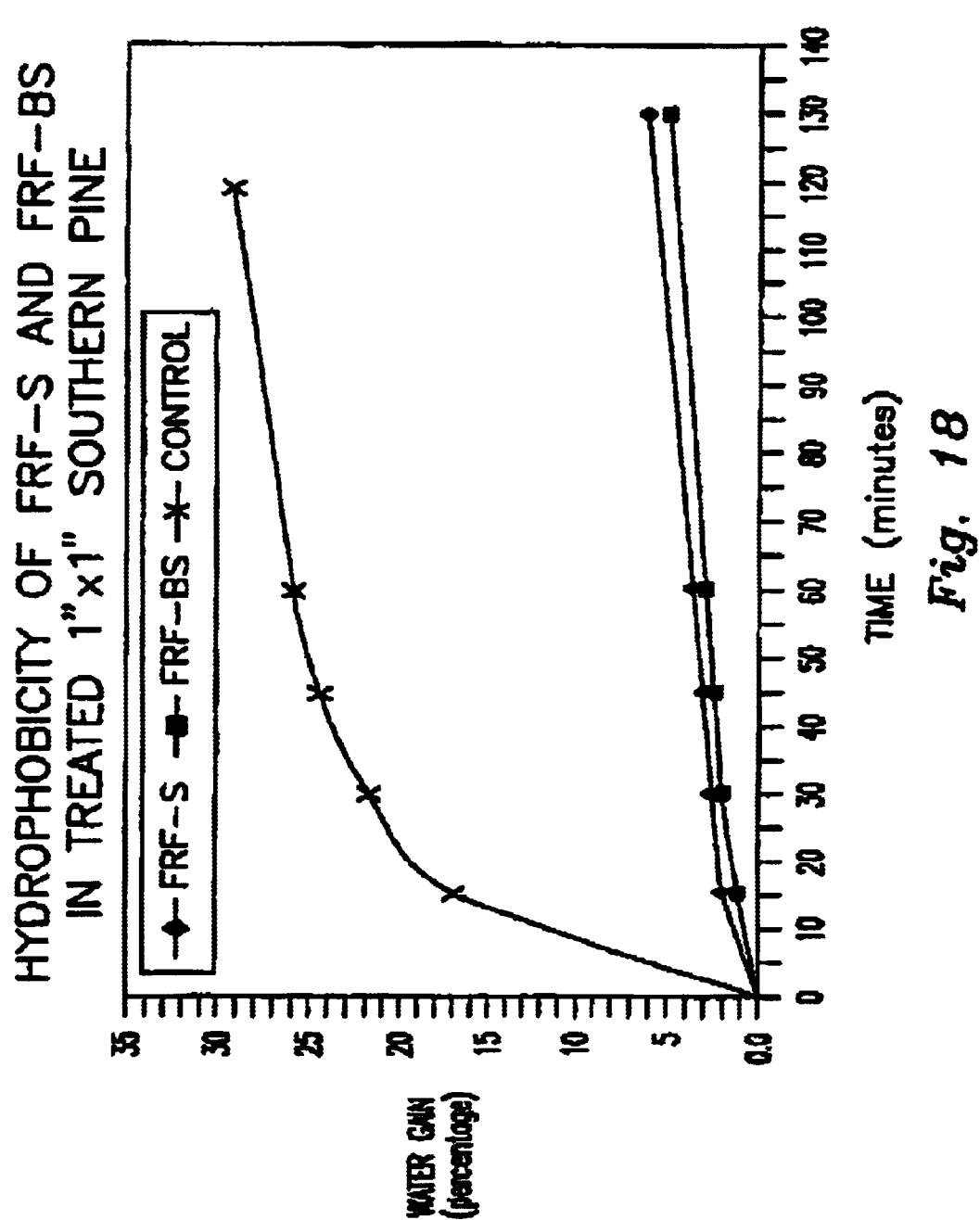
Figure 19:
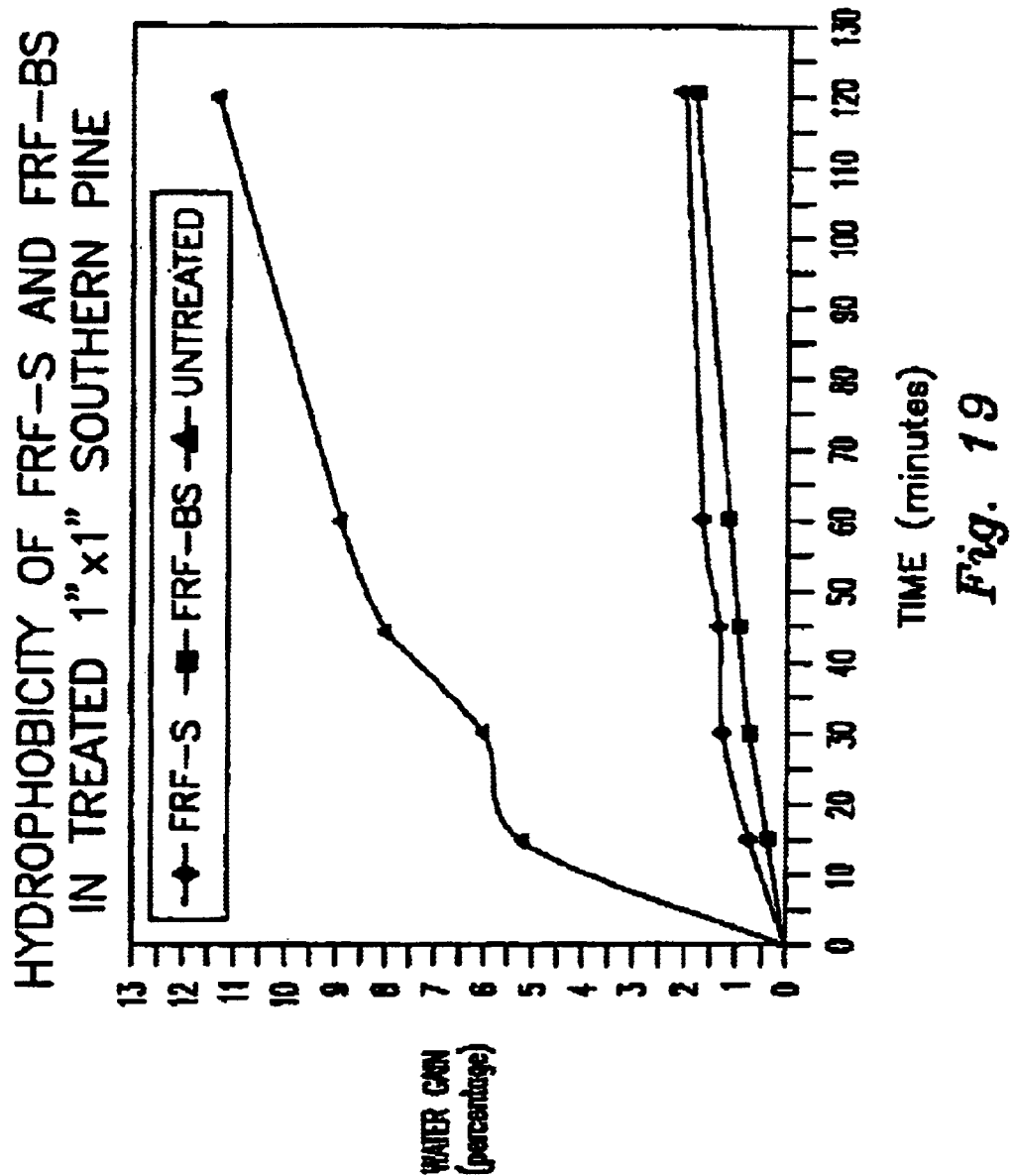
Figure 20:
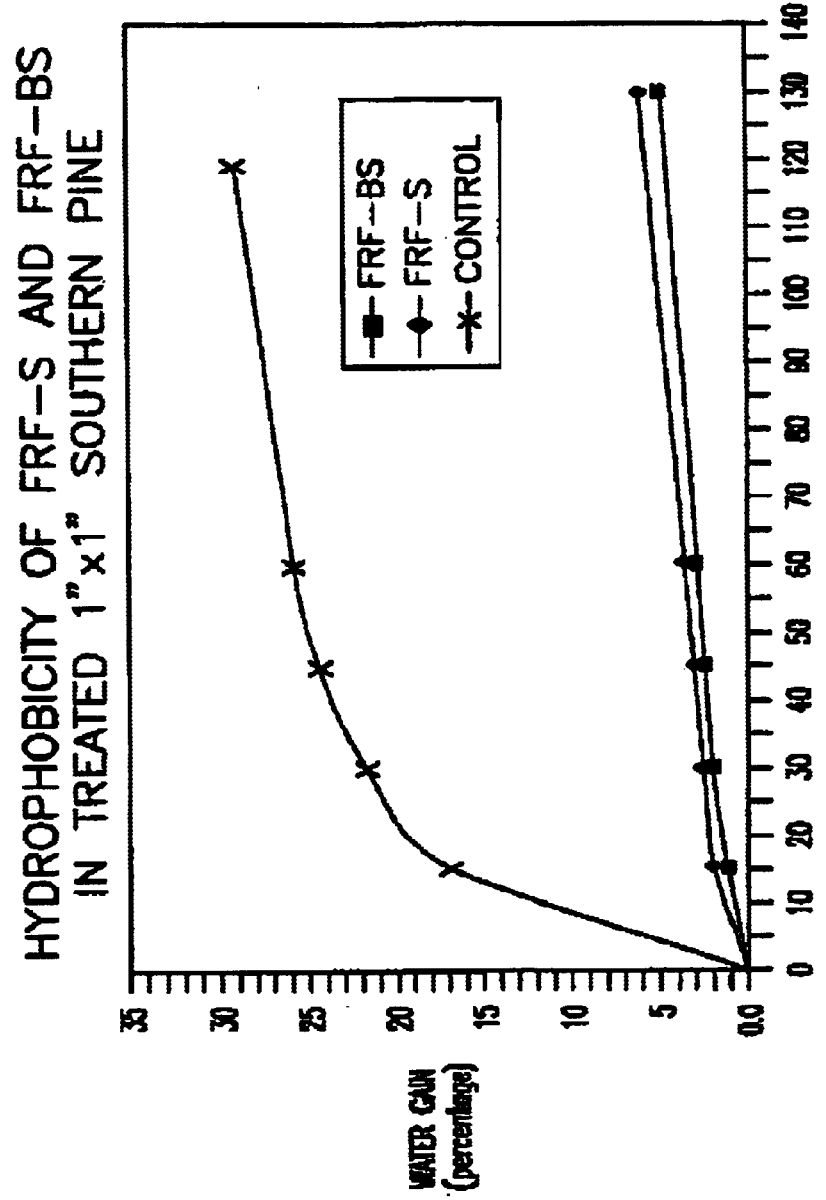
Figure 21:
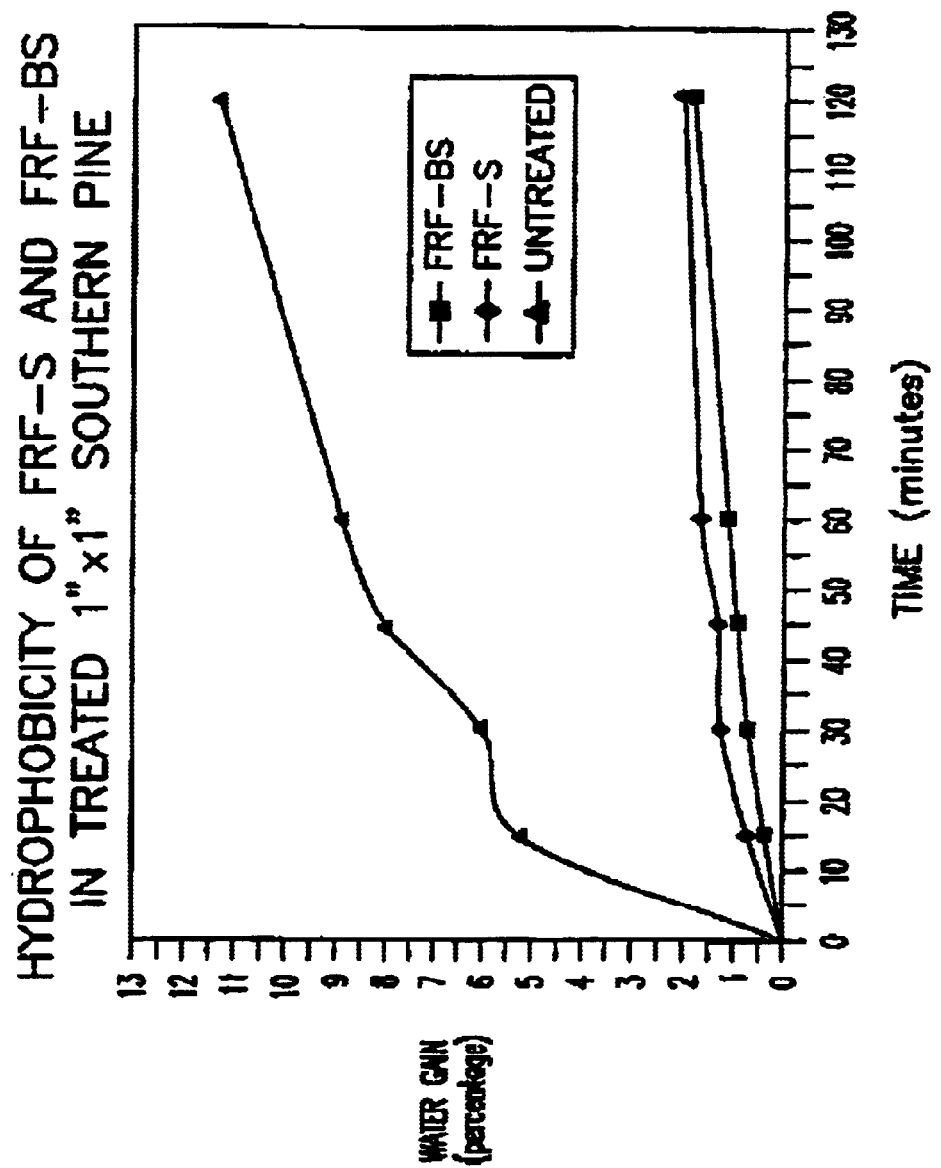

The difference between treated wood and untreated wood in terms of water absorption at different time intervals was phenomenal. FIG. 18-A shows the results with southern pine, a soft wood that has not been conditioned. At 30 minutes the untreated wood absorbed more than 20% of water while treated wood with both formulae had less than 2% water absorption. A comparison of water absorption at 30 minutes with that of 60 minutes for both samples indicate that further water absorption was less than 1.0% indicating that water is occluded initially on surface but not absorbed significantly as a function of time. In one hour untreated Southern pine of the same dimension and weight absorbed a remarkable 30% of water. Similar results were obtained with red oak (FIG. 18-B) that absorbed less water than southern pine as expected.

It should be noted that there has been complete immersion of wood within water for the entire indicated periods as opposed to floating the wood in water for 15 minutes or exposing wood under running water for a few minutes to evaluate water absorption by other investigators in the cited up on prior art.

EXAMPLE-4

Retention:

The water solution remaining after immersion of the respective treated samples for 24 hours performed as in Example-3 was transferred to a previously weighed beaker. First the FRF-S treated sample was examined. The solution was allowed to evaporate at room temperature. No residue was left in the beaker after complete evaporation. The beaker was weighed again. The results showed that there was no significant difference in the weight of the beaker before and after evaporation. The results showed that no silicon was leached out from the FRF-S treated wood pieces and the silicon is irreversibly bound to the wood molecules.

The FRF-BS treated sample and the FRF-MBS treated samples were similarly immersed and evaporation of the water showed minute residues, but the weights differences were insignificant indicating that both boron and silicon were retained within the wood without significant leaching out in complete agreement with expectations.

The wood pieces after leaching with water for 24 hours as above were weighed to constant weight. Twelve to twenty four (12–24) hours after the leaching experiment was performed the wood pieces returned to their initial weight. This experiment adduce further independent evidence that no incorporated reagents (boron and silicon) were leached out of the wood during prolonged immersion of treated wood in water. During the remaining one month a weight of loss of less than 0.5% was observed further substantiating that boron and silicon were not leaching from wood treated with the inventive formulae.

Because many varying and different embodiments may be made within the scope of the inventive concept herein taught and because many modifications may be made in the embodiment(s) herein detailed in accordance with the descriptive requirements of the law, it is to be understood that the details herein are to be interpreted as illustrative and not in a limiting sense.

What is claimed is:

1. A process for treating wood having wood cellulose having a plurality of hydroxyl groups comprising the steps of:
    providing a solution comprised of:
    a non-water-based hydrophilic organic solvent;
    a solute compound having a plurality of functional groups wherein each of which functional group includes:
        an atom selected from the group consisting of tetravalent atoms, wherein said atom is bonded to a halogen atom or a functional group selected from the group consisting of a hydroxyl group, alkoxy group, phenoxy group, benzyloxy group, an aryloxy group having a polycyclic aromatic ring, and combinations thereof; and
    at least one acid catalyst;
    applying said solution to the wood cellulose, and
    reacting said functional groups to form covalent bonds with other functional groups of said solute and to said wood cellulose and wherein the acid catalyst is produced by a pro-catalyst defined as a molecule producing an acid in the presence of wood cellulose or water in wood cellulose.

2. The process of claim 1 wherein the acid catalyst is in the range of 0.05–10% of the solution.

3. The process of claim 2 wherein the acid catalyst is in the range from 0.05 to 4.9% of the solution.

4. The process of claim 1 wherein the acid catalyst has a pKa of 4 or less.

5. The process of claim 4 wherein the acid catalyst has a pKa below 2.5.

6. The process of claim 1 wherein the acid catalyst is in the range of 0.01–10% in situ the wood.

7. The process of claim 1 wherein the pro-catalyst is a molecule comprised of silicone and a halogen.

8. The process of claim 1 wherein the concentration of non-hydrophilic organic solvents is in the range from 0–20%.

9. The process of claim 8 wherein the porcentage of non-hydrophilic organic solvents is in a range of 0 to 10%.

10. The process of claim 1 wherein the hydrophilic organic solvent is at a concentration of at least 10% of the solution.

11. The process of claim 9 wherein hydrophilic organic solvents are at a concentration of 30%–99.9% of the solution.

12. The process of claim 1 wherein the solution is less than 20% oligomers of the functional groups prior to applying the solution to the wood.

13. The method of claim 1 wherein the organic solvent is an organic solvent with a ($K_{ow}$) less than 10.0.

14. The method of claim 13 wherein the organic solvent is an organic solvent with a ($K_{ow}$) less than 1.0.

15. The method of claim 14 wherein the organic solvent is an organic solvent with a ($K_{ow}$) less than 0.

16. The process of claim 1 further comprising the step of:
    adding et least one non-reactive additive to the wood cellulose that enhances a desired property selected from the group consisting of:
    (1) fire resistance,
    (2) insect resistance,
    (3) moisture resistance,
    (4) color,
    (5) adhesion,
    (6) insulation, and
    (7) combinations thereof.

17. The process of claim 16 wherein the step of adding at least one non reactive additive further comprises adding the additive to the solution.

18. The process of claim 16 wherein the step of adding the at least one non-reactive addictive occurs before reacting the functional groups to bond with the wood cellulose.

19. The process of claim 16 wherein the additive is from the group consisting of:
   1) diatimatious earth,
   2) sodium silicates,
   3) boron or silicon salts,
   4) boric acid,
   5) trimethy (trialkyl) borate,
   6) Boron Halides ($BF_3$, $BCl_3$, etc.),
   7) Boric Anhydride (boron oxide),
   8) phosphorous compounds,
   9) copper compounds,
   10) metal alkoxide,
   11) meta-phosphoric acid;
   12) a hydrophobic reagents,
   13) phosphoric acid,
   14) metaphoshoric acid, and
   15) combinations thereof.

20. The process according to claim 1, wherein the wood cellulose has an original weight and wherein the duration of treatment attains a weight of compound which is covalently bonded to the wood cellulose having a range of 0.1 to 10 weight percent of the original weight of the wood cellulose.

21. The process according to claim 1 further comprising the step of maintaining said solute compound functional groups as monomers prior to applying said solution to wood having wood cellulose.

22. The process according to claim 21 further comprising the steps of simultaneous reaction and diffusion of the functional groups in the wood and self-initialing exothermic reaction of said fractional groups to form covalent bonds with other functional groups of said solute and to said wood cellulose.

23. The process of claim 22 wherein the acid catalyst comprises a substance which effects the exothermic reaction of the functional group so that the functional group bonds from the tetravalent atom across an oxygen of the cellulose hydroxyl group.

24. The process of claim 23 wherein the acid catalyst is added to the wood cellulose after application of said solution to the wood cellulose.

25. The process of claim 23 wherein the acid catalyst is added to the solution prior to application of the solution to the wood cellulose.

* * * * *